(12) United States Patent
Kuwahara

(10) Patent No.: US 8,958,829 B2
(45) Date of Patent: Feb. 17, 2015

(54) STORAGE MEDIUM HAVING STORED THEREIN INFORMATION PROCESSING PROGRAM, INFORMATION PROCESSING APPARATUS, INFORMATION PROCESSING METHOD AND INFORMATION PROCESSING SYSTEM

(75) Inventor: Masato Kuwahara, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 65 days.

(21) Appl. No.: 13/163,986

(22) Filed: Jun. 20, 2011

(65) Prior Publication Data

US 2012/0157129 A1    Jun. 21, 2012

(30) Foreign Application Priority Data

Dec. 16, 2010    (JP) ................................ 2010-280678

(51) Int. Cl.
| | |
|---|---|
| H04W 24/00 | (2009.01) |
| H04W 4/00 | (2009.01) |
| H04W 4/02 | (2009.01) |
| A63F 13/30 | (2014.01) |
| H04W 4/20 | (2009.01) |

(52) U.S. Cl.
CPC ................ *H04W 4/02* (2013.01); *A63F 13/12* (2013.01); *H04W 4/021* (2013.01); *H04W 4/206* (2013.01); *H04W 4/008* (2013.01); *A63F 2300/204* (2013.01); *A63F 2300/402* (2013.01); *A63F 2300/405* (2013.01); *A63F 2300/406* (2013.01)
USPC ....................... 455/457; 455/456.1; 455/426.2

(58) Field of Classification Search
USPC ........................................................ 455/457
See application file for complete search history.

(56) References Cited

U.S. PATENT DOCUMENTS

| | | | |
|---|---|---|---|
| 5,519,621 A * | 5/1996 | Wortham | 455/457 |
| 8,265,634 B1 * | 9/2012 | Bales et al. | 455/446 |
| 2005/0250552 A1 * | 11/2005 | Eagle et al. | 455/567 |
| 2005/0277427 A1 * | 12/2005 | Zhang | 455/456.1 |
| 2006/0234631 A1 * | 10/2006 | Dieguez | 455/41.2 |
| 2007/0177554 A1 | 8/2007 | Yang et al. | |
| 2008/0051989 A1 * | 2/2008 | Welsh | 701/208 |
| 2008/0318597 A1 * | 12/2008 | Berns et al. | 455/456.5 |

(Continued)

FOREIGN PATENT DOCUMENTS

| | | |
|---|---|---|
| JP | 2000-123027 | 4/2000 |
| JP | 2007-249918 | 9/2007 |

(Continued)

OTHER PUBLICATIONS

Office Action issued in U.S. Appl. No. 13/945,233 dated Oct. 30, 2014.

*Primary Examiner* — Lester Kincaid
*Assistant Examiner* — Andy Gu
(74) *Attorney, Agent, or Firm* — Nixon & Vanderhye PC

(57) ABSTRACT

Provided is an information processing system which facilitates data communication between an information processing apparatus and another apparatus. Position data indicative of a position, at which the information processing apparatus which makes up the information processing system automatically performs short-distance wireless communication, is transmitted to a server. The server accumulates and stores the position indicated by the position data transmitted from each information processing apparatus. The position data accumulated and stored at the server is transmitted to an information processing apparatus when the server receives the request therefrom.

34 Claims, 12 Drawing Sheets

(56) References Cited

U.S. PATENT DOCUMENTS

| | | |
|---|---|---|
| 2009/0024315 A1* | 1/2009 | Scheibe ........................ 701/208 |
| 2009/0115617 A1 | 5/2009 | Sano et al. |
| 2010/0115455 A1 | 5/2010 | Kim |
| 2010/0205242 A1* | 8/2010 | Marchioro et al. ........... 709/203 |
| 2010/0225756 A1 | 9/2010 | Miyata |
| 2012/0100875 A1* | 4/2012 | Tysowski ...................... 455/457 |

FOREIGN PATENT DOCUMENTS

| | | |
|---|---|---|
| JP | 2007-298744 | 11/2007 |
| JP | 2008-136737 | 6/2008 |
| JP | 2009-98446 | 5/2009 |
| JP | 2010-206670 | 9/2010 |
| JP | 2010-218524 | 9/2010 |

* cited by examiner

F I G. 1
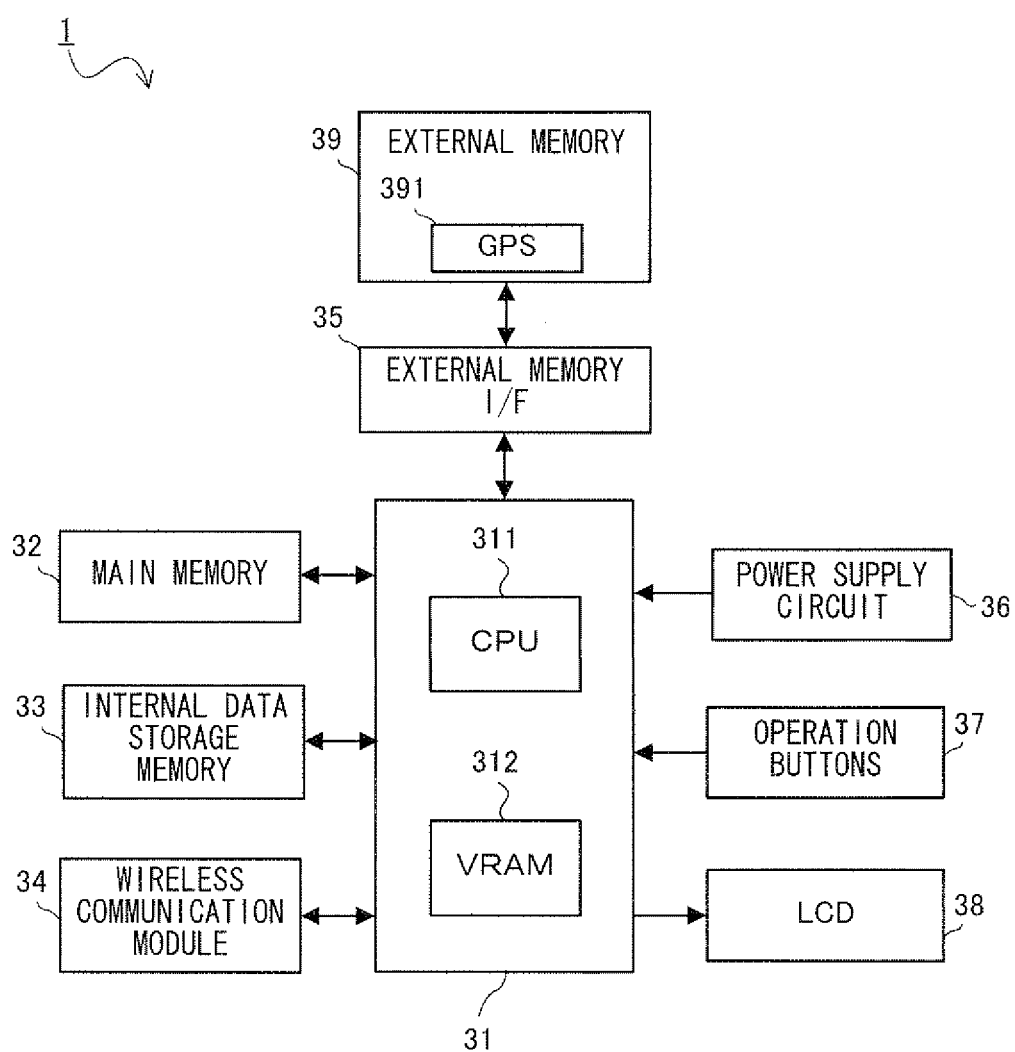

F I G. 8
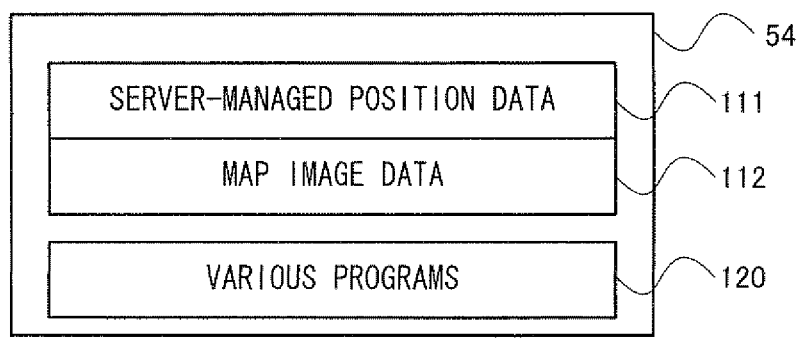

STORAGE MEDIUM HAVING STORED THEREIN INFORMATION PROCESSING PROGRAM, INFORMATION PROCESSING APPARATUS, INFORMATION PROCESSING METHOD AND INFORMATION PROCESSING SYSTEM

CROSS REFERENCE TO RELATED APPLICATION

The disclosure of Japanese Patent Application No. 2010-280678, filed on Dec. 16, 2010 is incorporated herein by reference.

FIELD

The present invention relates to a storage medium having stored therein an information processing program, an information processing apparatus, an information processing method, and an information processing system, and more specifically a storage medium having stored therein an information processing program for displaying a communication position of an information processing apparatus, the information processing apparatus, an information processing method and an information processing system.

BACKGROUND AND SUMMARY

Conventionally, there have been game apparatuses which exchanges data or the like indicative of items necessary for proceeding a game, by using wireless communications. For example, a game apparatus disclosed in Japanese Laid-Open Patent Publication No. 2008-136737 automatically searches for a game apparatus, which is a communication partner, within a communication range of the game apparatus, and performs automatic wireless communication in which the game apparatus automatically connects to the communication partner for data exchange when the communication partner is found.

By going out of home while carrying the game apparatus, a user of the game apparatus disclosed in Japanese Laid-Open Patent Publication No. 2008-136737 attempts the automatic wireless communication with a game apparatus of another user. It is, however, difficult for the user of the game apparatus disclosed in Japanese Laid-Open Patent Publication No. 2008-136737 to know locations in which the automatic wireless communication can be performed. The game apparatus disclosed in Japanese Laid-Open Patent Publication No. 2008-136737 therefore, cannot facilitate data communication with the other game apparatus. Thus, it is suspect in terms of improvement of interest in the game.

Therefore, an object of the present invention is to provide a storage medium having stored therein an information processing program which facilitates data communication with another apparatus, an information processing apparatus, an information processing method, and an information processing system.

In order to achieve the object, the present invention employs the following features.

The information processing system of the present invention includes a plurality of information processing apparatuses and a server apparatus communicable with the plurality information processing apparatuses. Each of the plurality of information processing apparatuses includes position information acquisition means, wireless communication means, and communication information transmission means. The position information acquisition means acquires a location of the information processing apparatus. The wireless communication means repeatedly searches for another information processing apparatus that is within a short-distance wireless communication range to automatically establish a wireless connection therewith and automatically perform communication with the other information processing apparatus, as a communication partner, with which the wireless connection is established. The communication information transmission means transmits to the server apparatus the location acquired by the position information acquisition means when the communication is performed by the wireless communication means, as a communication position of the information processing apparatus. The server apparatus includes record information generation means and record information transmission means. The record information generation means generates record information, based on the respective communication positions transmitted by the communication information transmission means of the plurality of information processing apparatuses, the record information indicating respective records of the communication performed by the plurality of information processing apparatuses. The record information transmission means transmits the record information generated by the record information generation means to the information processing apparatus. Also, each of the plurality of information processing apparatuses further includes record information output means. The record information output means outputs the record information transmitted by the record information transmission means of the server apparatus.

According to the above configuration example, the position at which the short-distance wireless communication is automatically performed by the information processing apparatus which makes up the information processing system can be managed as the communication position by the server apparatus. The information processing apparatus is then be able to receive and output the record information based on the communication positions managed by the server apparatus, therefore facilitating the data communication with another apparatus such as an information processing apparatus of another type. Furthermore, it is possible to provide a user of the information processing apparatus with the pleasure to find a location at which the short-distance wireless communication can highly likely be performed automatically.

In another configuration example, the record information output means may output the communication positions indicated by the record information to display means for display.

According to the above configuration example, the communication positions indicated by the record information can be visually provided to the user.

In another configuration example, the record information output means may output a current location acquired by the position information acquisition means and the communication positions indicated by the record information to the display means for display.

According to the above configuration example, the positional relationship between the current position of the user and the communication positions indicated by the record information can be easily understood by the user of the information processing apparatus.

In another configuration example, the record information output means may output a map indicative of distribution of the communication positions indicated by the record information to the display means for display as a distribution map.

According to the above configuration example, the distribution of the communication positions indicated by the record information is displayed on the map, and thereby intuitively understood by the user.

In another configuration example, the record information output means may output a map, in which respective images of the communication positions indicated by the record information are superimposed on a map image, to the display means for display as the distribution map.

According to the above configuration example, the communication positions indicated by the record information are represented by the respective images on the map and provided to the user.

In another configuration example, among the communication positions indicated by the record information, the communication positions that satisfy a predetermined positional relationship may be grouped and the record information output means may output a map, which includes a region formed of the grouped communication positions, to the display means for display as the distribution map.

According to the above configuration example, a region where the communication positions are dense thereby the automatic wireless communication is highly likely performed can be highlighted for display.

In another configuration example, the record information output means may output the distribution map, on which an image of a center position of the region formed of the grouped communication positions is further superimposed, to the display means for display.

According to the above configuration example, a position where the automatic wireless communication is most likely performed within the region where the communication positions are dense can be provided to the user.

In another configuration example, the record information output means may output the distribution map, on which an indicator for dividing the map into predetermined regions is further superimposed, to the display means for display.

According to the above configuration example, the user is able to understand positions at which the automatic wireless communication is performed in each of the predetermined regions divided based on the indicator on the map.

In another configuration example, based on the communication positions indicated by the record information, the record information output means may calculate a density of the communication positions included in each of the predetermined regions into which the map is divided based on the indicator and outputs a map, in which the predetermined regions are classified by color depending on a calculation result, to the display means for display as the distribution map.

According to the above configuration example, the predetermined regions on the map divided based on the indicator are each colored according to the density of the communication position, which allows the user to determine the possibility of the automatic wireless communication in each predetermined region.

In another configuration example, the record information output means may output a map, on which the indicator a fineness of which is adjusted according to the density of the communication positions included in each of the predetermined regions into which the map is divided based on the indicator, to the display means for display as the distribution map.

According to the above configuration example, the density of the communication positions in each predetermined region of the map divided based on the indicator can be provided to the user, using the fineness of each predetermined region.

In another configuration example, based on the communication positions indicated by the record information, the record information output means may calculate the density of the communication positions included in each of the predetermined regions into which the map is divided based on the indicator, and, if the calculated density of the communication positions in each of the respective predetermined regions is greater than a predetermined threshold value, the record information output means may output a map, on which an indicator for more finely dividing the predetermined regions is superimposed, to the display means for display as the distribution map.

According to the above configuration example, among the predetermined regions on the map divided based on the indicator, the regions divided based on an indicator having higher fineness can be provided to the user as regions having higher density of the communication positions.

In another configuration example, the record information output means may calculate a communication count which is obtained by counting the communication positions indicated by the record information in each of respective predetermined regions, and output a map indicative of distribution of the communication counts counted for each predetermined region to display means for display as a distribution map.

According to the above configuration example, positions where the automatic wireless communication can highly likely be performed can be provided to the user, using the count of automatic wireless communication performed in each predetermined region on the map.

In another configuration example, the record information output means may output a map in which the predetermined regions into which the map is divided based on an indicator are classified by color according to the communication counts counted for respective predetermined regions, to the display means for display as the distribution map.

According to the above configuration example, since the regions into which the map is divided based on the indicator are classified by color according to the communication count, the user is able to determine the possibility of performing the automatic wireless communication in each of the regions into which the map is divided based on the indicator by color according to the communication count.

In another configuration example, the record information output means may output a list of respective names of regions that include the communication positions indicated by the record information, to display means for display.

According to the above configuration example, the respective names of the communication positions can be listed and thus provided to the user.

In another configuration example, the record information output means may extract the regions that include the communication positions indicated by the record information from among regions of a map divided by a predetermined method, and output a list of respective names of the extracted regions to the display means for display.

According to the above configuration example, among the regions on the map, the regions at which the automatic wireless communication is performed can be listed and provided to the user.

In another configuration example, the communication information transmission means may further transmit to the server apparatus time information regarding time associated with the communication position at which the communication is performed by the wireless communication means, together with the communication position. In this case, the record information generation means may generate the record information which indicates, as the respective records of the communication, the respective communication positions of the plurality of information processing apparatuses transmitted by the communication information transmission means of each of the plurality of information processing apparatuses and the time information associated with the respective communication positions.

According to the above configuration example, the positions, at which the automatic wireless communication can highly likely be performed, can be provided to the user, using the communication positions and time information.

In another configuration example, the record information output means may output the communication positions, which are associated with the time information within a predetermined time period and are included in a predetermined region, to display means for display.

According to the above configuration example, among the communication positions accumulated at the server apparatus, only the communication positions at which the automatic wireless communication is performed in the predetermined time period can be provided to the user.

In another configuration example, among the communication positions indicated by the record information, the record information output means may count the communication positions, which are associated with the time information within a time period designated by a user and are included in a region specified by the user, as communication count, and output transition of the communication count within the time period to the display means for display.

According to the above configuration example, since the transition of the count of automatic wireless communications performed at a region desired by the user in a time period desired by the user can be provided to the user, the user is able to understand a period where the automatic wireless communication can highly likely be performed within the desired time period.

In another configuration example, the record information output means may output a result obtained by predicting, based on the communication positions and time information indicated by the record information, the transition of the communication count in the region specified by the user within the time period designated by the user, to display means for display.

According to the above configuration example, the information obtained by predicting a period where the automatic wireless communication can highly likely be performed in the time period desired by the user in the region desired by the user can be provided to the user.

In another configuration example, the communication information transmission means may transmit, to the server apparatus, program information indicative of a program which handles information communicated by the wireless communication means, together with the communication position at which the communication is performed by the wireless communication means. In this case, the record information generation means may generate the record information, based on the program information and communication position transmitted by the communication information transmission means of each of the plurality of information processing apparatuses, the record information indicating the respective communication positions of the plurality of information processing apparatuses in association with the program indicated by the program information.

According to the above configuration example, the positions where the automatic wireless communication of the data handled by the program indicated by the program information can highly likely be performed can be provided to the user.

In another configuration example, the record information output means may output the communication positions associated with the program information of a program selected by a user to display means for display.

According to the above configuration example, the positions, at which the automatic wireless communication of the data handled by the program desired by the user is performed, can be provided to the user.

In another configuration example, the communication information transmission means may transmit, to the server apparatus, user information indicative of a user of the information processing apparatus with which the communication is performed by the wireless communication means, together with the communication position at which the communication is performed by the wireless communication means. In this case, the record information generation means generates the record information, based on the communication position and user information transmitted by the communication information transmission means of each of the plurality of information processing apparatuses, the record information indicating the respective communication positions of the plurality of information processing apparatuses in association with the user information, as the respective records of the communication performed by the plurality of information processing apparatuses.

According to the above configuration example, the position, at which the automatic wireless communication is performed by the information processing apparatus of the user indicated by the user information, can be provided.

In another configuration example, the record information output means may output the communication position associated with the user information indicative of a user previously registered in the own information processing apparatus, based on the communication position and user information indicated by the record information transmitted by the record information transmission means, to display means for display.

According to the above configuration example, the communication positions at which the automatic wireless communication is performed by only the information processing apparatus of the user previously registered thereto can be provided to the user. It is possible to cause the user of the information processing apparatus to understand the communication positions of other users having a relationship with as close as previously registering the other users in the information processing apparatus.

In another configuration example, the server apparatus may further include communication information reception means and count means. The communication information reception means receives the communication position and user information together transmitted by the communication information transmission means of each of the plurality of information processing apparatuses. The count means counts the communication positions which are received by the communication information reception means within a predetermined time period for each user information transmitted together with the communication position.

According to the above configuration example, the communication count is managed for each user of the information processing apparatus which performs the automatic wireless communication, which can be used for ranking the users according to the communication count.

Also, another information processing system of the present invention is an information processing system which includes a plurality of information processing apparatuses and a server apparatus communicable with the plurality of information processing apparatuses. Each of the plurality of information processing apparatuses includes position information acquisition means, wireless communication means, and communication information transmission means. The position information acquisition means acquires a location of the information processing apparatus. The wireless communication means repeatedly searches for another apparatus that is within a short-distance wireless communication range to automatically establish a wireless connection therewith and automatically perform communication with the other apparatus, as a communication partner, with which the wireless connection is established. The communication acceptance information transmission means transmits, to the server apparatus, communication acceptance information indicative of a state where the communication by the wireless communication means is acceptable, together with the location acquired by the position information acquisition means. The server apparatus includes communication acceptable information transmission means. The communication acceptable information transmission means transmits to each of the plurality of information processing apparatuses a latest location of the information processing apparatus capable of accepting the communication by the wireless communication means, the latest location being transmitted based on the communication acceptance information transmitted by the communication acceptance information transmission means of each of the plurality of information processing apparatuses. Each of the plurality of information processing apparatuses further includes output means. The output means outputs the latest location transmitted by the communication acceptable information transmission means.

According to the above configuration example, among the information processing apparatuses which make up the information processing system, a location of the information processing apparatus that is in a state to automatically perform the wireless communication can be provided to the information processing apparatuses, therefore facilitating the data communication with other apparatuses. Furthermore, it is possible to provide the users of the information processing apparatuses with the pleasure to find a location at which the automatic wireless communication can highly likely be performed.

Also, another of information processing system of the present invention is an information processing system which includes a plurality of information processing apparatuses and a server apparatus communicable with the plurality of information processing apparatuses. Each of the plurality of information processing apparatuses includes position information acquisition means, wireless communication means, and communication information transmission means. The position information acquisition means acquires a location of the information processing apparatus. The wireless communication means repeatedly searches for another apparatus that is within a short-distance wireless communication range to automatically establish a wireless connection therewith and automatically perform communication with the other apparatus, as a communication partner, with which the wireless connection is established. The communication information transmission means transmits to the server apparatus the location acquired by the position information acquisition means when the communication is performed by the wireless communication means, as a communication position of the information processing apparatus. The server apparatus includes communication information storage means, generation means, and output information transmission means. The communication information storage means accumulates and stores the communication position transmitted by the communication information transmission means of each of the plurality of information processing apparatuses. The generation means generates the communication positions accumulated by the communication information storage means as output information to be output by each of the plurality of information processing apparatuses. The output information transmission means transmits the output information generated by the generation means to each of the plurality of information processing apparatuses. Each of the plurality of information processing apparatuses further includes output means. The output means outputs the output information transmitted by the output information transmission means.

According to the above configuration example, the position at which the short-distance wireless communication is automatically performed in the information processing apparatus which makes up the information processing system can be managed as the communication position at the server apparatus. The server apparatus generates the record information indicative of the managed communication position and transmits the generated record information to the information processing apparatus, therefore facilitating the data communication with other apparatuses. Furthermore, the pleasure to find the location at which the short-distance wireless communication can highly likely be performed automatically can be provided to the user.

Also, another information processing system of the present invention is an information processing system which includes a plurality of information processing apparatuses and a server apparatus communicable with the plurality of information processing apparatuses. Each of the plurality of information processing apparatuses includes position information acquisition means, wireless communication means, and communication information transmission means. The position information acquisition means acquires a location of the information processing apparatus. The wireless communication means repeatedly searches for another apparatus that is within a short-distance wireless communication range to automatically establish a wireless connection therewith and automatically perform communication with the other apparatus, as a communication partner, with which the wireless connection is established. The communication information transmission means transmits to the server apparatus as a communication position, either one of the location of the information processing apparatus acquired by the position information acquisition means when the communication is performed by the wireless communication means and a location acquired by the position information acquisition means of the communication partner. The server apparatus includes record information generation means and record information transmission means. The record information generation means generates record information, generated based on the respective communication positions transmitted by the communication information transmission means of the plurality of information processing apparatuses, the record information indicating respective records of the communication performed by the plurality of information processing apparatuses. The record information transmission means transmits the record information generated by the record information generation means to the information processing apparatus. Also, each of the plurality of information processing apparatuses further includes record information output means. The record information output means outputs the record information transmitted by the record information transmission means of the server apparatus.

According to the above configuration example, any one of the respective locations of the information processing apparatuses that automatically perform the short-distance wireless communication therebetween among the information processing apparatuses which makes up the information processing system can be managed as the communication position at the server apparatus. The information processing apparatus can receive and output the record information indicative of the communication position managed at the server apparatus, therefore, facilitating the data communication with other apparatuses. Furthermore, the pleasure to find the location at which the short-distance wireless communication can highly likely be performed automatically can be provided to the user.

Also, another information processing system of the present invention is an information processing system which includes a plurality of information processing apparatuses and a server apparatus communicable with the plurality of information processing apparatuses. Each of the plurality of information processing apparatuses include position information acquisition means, wireless communication means, and communication information transmission means. The position information acquisition means acquires a location of the information processing apparatus. The wireless communication means repeatedly searches for another apparatus that is within a short-distance wireless communication range and which has necessary information to be transmitted/received, to automatically establish a wireless connection therewith and automatically transmit/receive the necessary information to/from the other apparatus, as a communication partner, with which the wireless connection is established. The communication information transmission means transmits to the server apparatus the location acquired by the position information acquisition means when the necessary transmission/reception of the information is conducted to/from the communication partner, as a communication position of the information processing apparatus. The server apparatus includes record information generation means and record information transmission means. The record information generation means generates record information, based on the respective communication positions transmitted by the communication information transmission means of the plurality of information processing apparatuses, the record information indicating respective records of the communication performed by the plurality of information processing apparatuses. The record information transmission means transmits the record information generated by the record information generation means to the information processing apparatus. Also, each of the plurality of information processing apparatuses further includes record information output means. The record information output means outputs the record information transmitted by the record information transmission means of the server apparatus.

According to the above configuration example, when necessary information is transmitted/received between the information processing apparatuses which make up the information processing system, the location at which the transmission/reception is conducted can be managed as the communication position at the server apparatus. That is, only the communication position, at which the transmission/reception of the necessary information is completed normally, can be managed at the server apparatus. Then, the server apparatus generates the performance information indicative of the managed communication position to transmit the generated performance information to the information processing apparatus, therefore facilitating the data communication with other apparatuses. Furthermore, the pleasure to find the location at which the short-distance wireless communication can highly likely be performed automatically can be provided to the user.

Also, the present invention may be implemented in a form of an information processing apparatus which includes the means described above or a storage medium which stores therein an information processing method or information processing program which includes respective operations performed by the means described above.

According to the present invention, the storage medium having stored therein the information processing program which facilitates the data communication with another apparatus, the information processing apparatus, the information processing method and the information processing system can be provided.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a diagram showing an example internal configuration of a game apparatus according to the present invention;

FIG. 8 is a diagram showing an example of data to be stored in an HDD of the server according to the present invention;

DESCRIPTION OF THE PREFERRED EMBODIMENTS

[Internal Configuration of Game Apparatus 1]

Figure 2:
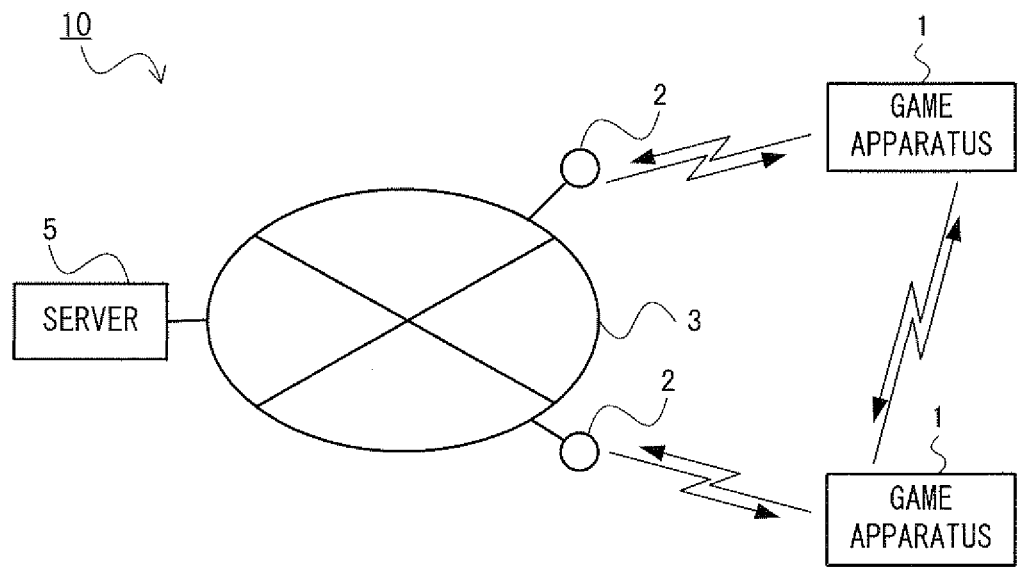
FIG. 2 is a diagram showing an example configuration of an information processing system according to the present invention.

FIG. 1 is a diagram showing an example internal configuration of a game apparatus 1 according to an embodiment of the present invention. In the present embodiment, the case where the game apparatus 1 is a hand-held game apparatus portable by a user is described by way of example. The game apparatus 1 according to the present embodiment includes electronic parts such as an information processing section 31, a main memory 32, an internal data storage memory 33, a wireless communication module 34, an external memory I/F 35, a power supply circuit 36, operation buttons 37, an LCD (Liquid Crystal Display) 38, and the like.

The information processing section 31 includes a CPU (Central Processing Unit) 311 and a VRAM (Video RAM) 312. The CPU 311 executes a predetermined program. When the CPU 311 executing the predetermined program generates image data, the image data is written to the VRAM 312. The image data written to the VRAM 312 is output to the LCD 38 by an output circuit (not shown), thereby displaying an image represented by the image data on the LCD 38.

Also, the main memory 32, the internal data storage memory 33, the wireless communication module 34, the external memory I/F 35, the power supply circuit 36, the operation buttons 37, the LCD 38, and the like are connected to the information processing section 31.

The main memory 32 is volatile storage means used as a work area or a buffer area for the CPU 311. That is, the main memory 32 temporarily stores various types of data used for communication processing, application processing, and the like, and temporarily stores a predetermined program acquired from the outside (an external memory 39 or another device, for example). In the present embodiment, the use of a PSRAM (Pseudo-SRAM) as an example of the main memory 32 is assumed.

The internal data storage memory 33 is implemented as a nonvolatile readable and writable memory (for example, a NAND flash memory), and is used for storing predetermined programs and predetermined data. For example, a program for wireless communication using the wireless communication module 34 and data transmitted or received by the wireless communication are stored in the internal data storage memory 33.

The wireless communication module 34 has a function of connecting to a wireless LAN by a method conforming to, for example, IEEE 802.11.b/g/n standard. The function of connecting to the wireless LAN is used for directly communicating wirelessly with another device such as a stationary game apparatus and an access point described below. Also, as will be described, the access point is connected to the Internet communication network 3 in the present embodiment. Therefore, if the CPU 311 uses the wireless communication module 34, communication even with the stationary game apparatus or another device via the Internet communication network 3 can be performed. In addition, the wireless communication module 34 also has a function of performing the wireless communication with another hand-held game apparatus of the same type by a predetermined communication scheme (this scheme is used for below-described "automatic wireless communication"). In the present embodiment, it is assumed, as an example, that the wireless communication performed with the other hand-held game apparatus of the same type by the predetermined communication scheme is short-distance wireless communication which uses a radio wave having intensity which allows the communicable range to be a few tens of meters. In this manner, by using the wireless communication module 34, the CPU 311 is able to transmit/receive data to/from another device such as the stationary game apparatus or another hand-held game apparatus of the same type.

The external memory I/F 35 includes a connector (not shown) for electrically connecting the external memory 39 to the game apparatus 1. The external memory I/F 35 reads/writes data from/to the external memory 39 attached to the aforementioned connector, according to an instruction given from the CPU 311. For example, the predetermined program is read out from the external memory 39 and executed by the CPU 311 or data, which is generated in accordance with the CPU 311 executing the program, is written to the external memory 39.

The power supply circuit 36 controls power from a power supply (typically, a rechargeable battery) included in the game apparatus 1, and supplies the power to the components of the game apparatus 1.

The operation buttons 37 include operation buttons provided at a plurality of positions where these buttons are operable by a finger when the user holds the game apparatus 1. Operation data indicative of an input state of each operation button 37 is output from the corresponding operation button 37 to the CPU 311, and the input state indicates whether or not the operation button 37 has been pressed. The CPU 311 acquires the operation data output from each operation button 37 to perform a process according to the input from the user made on the operation button 37.

The LCD 38 acquires the image data, which is written to the VRAM 312, from the output circuit (not shown) and displays an image represented by the acquired image data.

As shown by way of example in FIG. 1, the external memory 39 is connected to the external memory I/F 35. The external memory 39 is nonvolatile storage means for storing programs which are executed by the CPU 311. The external memory 39 includes, for example, a read-only semiconductor memory and a readable and writable semiconductor memory. The external memory 39 is detachably connected to the external memory I/F 35. When the external memory 39 is connected to the external memory I/F 35, the CPU 311 can load a program stored in the external memory 39. The program loaded by the CPU 311 is stored in the main memory 32. The CPU 311 executes the program stored in the main memory 32, and thereby a predetermined process is performed. Data (for example, the image data, and the like), which is necessary for the CPU 311 to execute programs, is also stored in the external memory 39. The data required by the CPU 311 can be loaded from the external memory 39 by the CPU 311 if the external memory 39 is connected to the external memory I/F 35. The data loaded by the CPU 311 is stored in the main memory 32, and loaded therefrom, according to need, by the CPU 311 which executes programs.

Also, the external memory 39 includes GPS (Global Positioning System) 391 as shown by way of example in FIG. 1. The GPS 391 sequentially determines a position on the earth by using a conventionally known scheme based on a signal emitted from an artificial satellite going around the earth orbit. The position determined by the GPS 391 is a location of the game apparatus 1 on the earth. The position is represented by latitude and longitude. The GPS 391 determines the position at predetermined time intervals. Each time in determining the position, the GPS 391 generates position data which indicates the determined position. The position data generated by the GPS 391 is loaded according to need by the CPU 311 in the same manner as the other data stored in the external memory 39 is loaded therefrom.

This is the description of the example internal configuration of the game apparatus 1 according to the present embodiment. Next, an example of an information processing system according to the present embodiment will be described.

[Configuration of Information Processing System]

FIG. 2 is a diagram showing an example configuration of the information processing system 10 according to the present embodiment. As shown by way of example in FIG. 2, the information processing system 10 according to the present embodiment includes one or more game apparatuses 1, one or more AP (Access Point) 2, the Internet communication network 3, and the server 5.

The AP2 is a conventionally known access point. In the present embodiment, as an example, it is assumed that all the AP2 are connected to the Internet communication network 3. Also, in the present embodiment, AP provided by a manufacturer of the game apparatuses 1, AP provided at a user's private residence, AP provided by a company other than the manufacturer, and the like correspond to the AP2 shown in FIG. 2 by way of example. The AP2 each include a function of automatically searching for the game apparatuses 1 positioned within the communicable range. On the other hand, as will be described below, the game apparatus 1 can automatically start the wireless communication in accordance with the AP2 that exists within the communicable range and automatically searching for the game apparatuses 1. Therefore, the AP2 can relay, automatically or according to a request received from the game apparatus 1, communication between the game apparatus 1 and various types of communication terminals (for example, the server 5 described below, and the like), which are connected to the Internet communication network 3.

The server 5 is connected to the Internet communication network 3 and transmits/receives data to/from each game apparatus 1 via the AP2 which is also connected to the Internet communication network 3.

This is the description of the example configuration of the information processing system 10 according to the present embodiment. Next, an example internal configuration of the server 5 will be described.

[Internal Configuration of Server]

Figure 3:
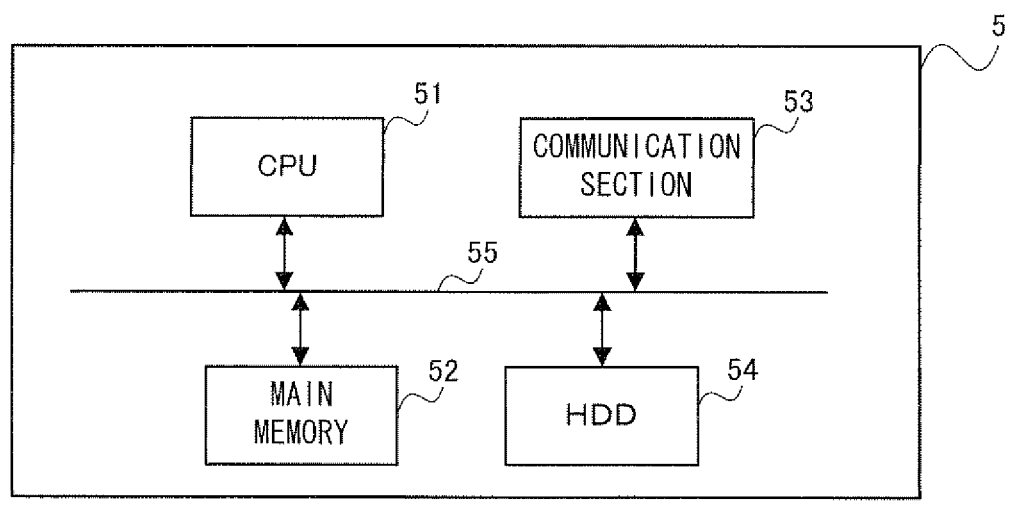
FIG. 3 is a diagram showing an example internal configuration of a server according to the present invention.

FIG. 3 is a diagram showing an example internal configuration of the server 5. In FIG. 3, the server 5 includes a CPU 51, a main memory 52, a communication section 53, and an HDD 54 which are communicably connected to one another via a communication bus 55.

The CPU 51 executes a predetermined program. The main memory 52 is volatile storage means used as a work area or a buffer area for the CPU 51. The main memory 52 temporarily stores various types of data which is used when the CPU 51 executes the predetermined program, and temporarily stores programs that are loaded from the HDD 54. In the present embodiment, the use of a PSRAM as an example of the main memory 52 is assumed.

The communication section 53 is connected to the Internet communication network 3. The communication section 53 executes transmission/reception of data between the server 5 and various types of devices connected to the Internet communication network 3, in accordance with an instruction given from the CPU 51. The communication section 53 is used according to need when the CPU 51 executes the predetermined program. By using the communication section 53, the CPU 51 can perform communication, according to need, with each game apparatus 1 via the Internet communication network 3 and the AP2.

The HDD 54 is a conventionally known hard disk drive and is a storage device for storing the program which is executed by the CPU 51. The CPU 51 loads the program stored in the HDD 54, and stores the program in the main memory 52. The CPU 51 executes the program that has been loaded from the HDD 54 and stored in the main memory 52, and thereby a predetermined process is performed. Data, which is necessary for the CPU 51 to execute the program, is also stored in the HDD 54 The data required by the CPU 51 is loaded from the HDD 54 and stored in the main memory 52. The data stored in the main memory 52 is loaded according to need by the CPU 51 which executes the program.

This is the description of the example internal configuration of the server 5 according to the present embodiment. Next, an outline of a process performed in the information processing system 10 according to the present embodiment will be described.

[Outline of Information Processing System]

In the information processing system 10 (hereinafter, referred to as present system) according to the present embodiment, respective positions of the game apparatuses 1 when performing the automatic wireless communication described below are managed as communication positions by the server 5. More specifically, the game apparatus 1 in the present system acquires the position data generated by the GPS 391, when performing the automatic wireless communication. The position data acquired by the game apparatus 1 is transmitted as the position data representing the communication position to the server 5. The server 5 accumulates and stores in the main memory 52 the position data transmitted from each game apparatus 1 in the present system. This allows the server 5 to manage all communication positions of all the game apparatuses 1 in the present system.

The communication positions managed by the server 5 are transmitted from the server 5 to the requestor game apparatus 1, according to the request received from the game apparatus 1. More specifically, the game apparatus 1 according to the present embodiment can display the communication positions managed by the server 5 by performing communication with the server 5. In the description of the present embodiment, the case where, among the communication positions managed by the server 5, the game apparatus 1 displays the communication positions that are near the game apparatus 1 is described by way of example. When displaying the communication positions that are near the game apparatus 1, the game apparatus 1 requests the communication positions from the server 5. For requesting the communication positions, the game apparatus 1 acquires the position data from the GPS 391 as data which represents the current position of itself. The game apparatus 1 then transmits the acquired position data to the server 5, thereby requesting the communication positions that are near the current position from the server 5. When received the request of the communication positions from the game apparatus 1, the server 5 generates a communication position image which indicates the requested communication positions that are near the current position of the game apparatus 1 on a map image. After generating the communication position image, the server 5 transmits the communication position image data, which represents the generated communication position image, to the game apparatus 1 that has requested the communication positions.

Figure 4:
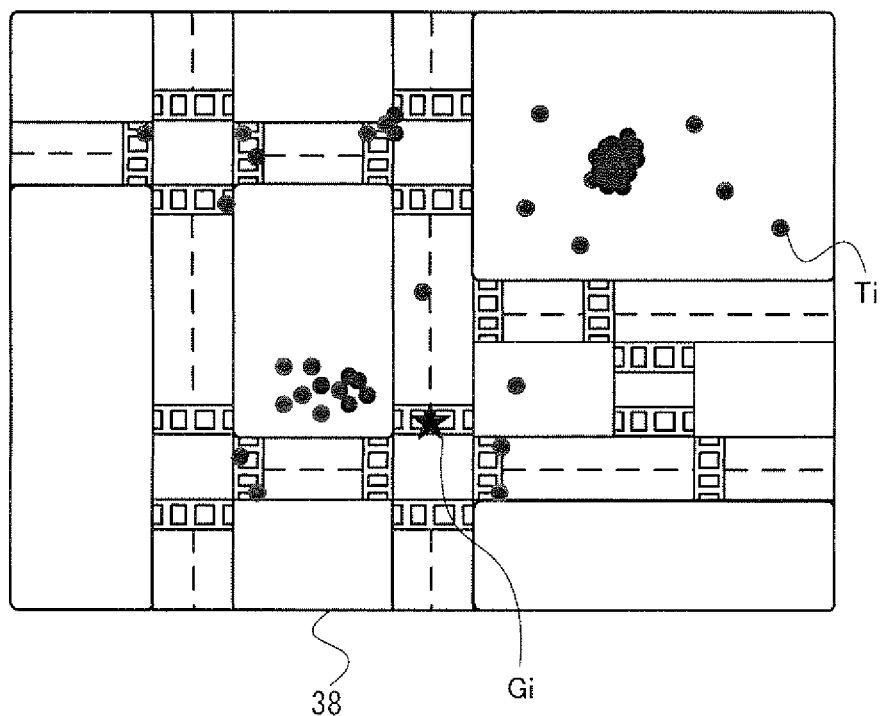
FIG. 4 is an example of a display state of communication positions in the present invention.

This allows, in the present system, each game apparatus 1 to acquire the communication positions that are near the game apparatus 1, according to need. Each game apparatus 1 can then display on the LCD 38 the communication position image which is represented by the communication position image data acquired from the server 5. FIG. 4 is a diagram showing an example display state in which the communication position image generated by the server 5 is displayed on the LCD 38. In FIG. 4, the communication position image is displayed on the entire display screen of the LCD 38. A current position Gi of the game apparatus 1 is indicated at a display position of an image representing a star, and communication positions Ti that are near the game apparatus 1 are indicated at respective display positions of images each representing a circle. While, in FIG. 4, a symbol Ti is added to merely one image representing a circle, it is assumed that the display positions of all the images of a circle in FIG. 4 each indicate a corresponding communication position Ti. The current position Gi may not necessarily be displayed when the communication positions Ti are displayed. In this manner, in the present system, the positions, at which the automatic wireless communication is performed, near the game apparatus 1, can be provided to the user.

The case where the game apparatuses 1 performing the automatic wireless communication therebetween communicate with the server 5 is shown by way of example in FIG. 2. However, as will be apparent, even the game apparatus 1 not performing the automatic wireless communication can request the communication positions from the server 5 and display the communication position image.

This is the description of the outline of the present system. Next, an outline of the automatic wireless communication which is performed by each game apparatus 1 of the present system will be described.

[Outline of Automatic Wireless Communication]

The external memory 39 attachable to the game apparatus 1 of the present system includes one or more various types of external memories 39 in which predetermined programs, such as a predetermined game program and a predetermined application program, are previously stored. The user of the game apparatus 1 can select the external memory 39 in which a desired program is previously stored, from among the one or more various types of external memories 39, and attach the external memory 39 to the user's game apparatus 1. The programs previously stored in the external memory 39 include a program capable of transmission and reception of particular data by the automatic wireless communication. In the present embodiment, the case where the external memory 39 having stored therein the game program that requires the transmission and reception of the particular data by the automatic wireless communication is connected to the external memory I/F 35 is described by way of example. Also, in the present embodiment, the case where the particular data is data (hereinafter, referred to as item data) representing an item which is required for proceeding the game and is provided to the user by the game program is described by way of example.

The game program that requires the automatic wireless communication is typically configured so that, when the CPU 311 is executing the game program, the item data can be specified in a particular scene, in accordance with an operation performed by the user on each operation button 37. The CPU 311 executes a program (hereinafter, referred to as automatic wireless communication program) which causes the CPU 311 to perform the automatic wireless communication, and thereby the item data specified by the user is transmitted or received. That is, the item data is transmitted or received by the CPU 311 executing the automatic wireless communication program which is independent of the game program.

The item data is stored in the internal data storage memory 33 when specified by the user. In addition, the item data received by the automatic wireless communication is also stored in the internal data storage memory 33. The item data specified by the user and the item data received by the automatic wireless communication are stored in a dedicated area (hereinafter, referred to as automatic wireless communication data area) in the internal data storage memory 33. The item data specified by the user and the item data received by the automatic wireless communication are stored in the automatic wireless communication data area so as to correspond to the game program that handles the item data.

In the present embodiment, it is assumed that the automatic wireless communication program is continuously executed by the CPU 311 as long as the game apparatus 1 is turned on. For example, when the game program is executed in the game apparatus 1, the automatic wireless communication program is executed in parallel with the game program. Also, for example, even when the game program is not executed in the game apparatus 1, the automatic wireless communication program is performed as long as the game apparatus 1 is turned on.

When the automatic wireless communication program is executed in the game apparatus 1, the CPU 311 uses the wireless communication module 34 to repeatedly search for other game apparatuses 1 that exist within the communicable range, according to the automatic wireless communication program. When the game apparatus 1 that has the item data handled by the same game program is found, these game apparatuses 1 wirelessly connect to each other to execute transmission/reception of the item data therebetween.

This allows the user of the game apparatus 1 to automatically transmit and provide the specified item to the game apparatus 1 of another user even when the game apparatus 1 of the user is not in use. On the other hand, the user of the game apparatus 1 can automatically receive and acquire the item specified by the user of the another game apparatus 1 from the another game apparatus 1. Implementing the game apparatus 1 as one having the hand-held type as described above allows the user to go out while carrying the game apparatus 1 of the present system with him/her. The automatic wireless communication is automatically performed even when the game apparatus 1 is not in use as described above. This provides the user with anticipation that the user may be able to acquire an item required for proceeding the game while being out merely by going out while carrying the game apparatus 1 with him/her without using it, and pleasure that the user was be able acquire the item while being out without noticing.

This is the outline of the automatic wireless communication which is executed by each game apparatus 1 of the present system. Next, an outline of server process for the server 5 of the present system to manage the communication positions of the game apparatuses 1 will be described.

[Outline of Server Process]

Each game apparatus 1 of the present system transmits to the server 5 the position data acquired from GPS 391 when performing the automatic wireless communication as the position data representing the communication position. The position data transmitted from each game apparatus 1 of the present system is accumulated and stored in the HDD 54 of the server 5.

The communication positions each represented by the position data accumulated in the HDD 54 are transmitted from the server 5 to the requestor game apparatus 1 when the server 5 receives the request received from the game apparatus 1. In the present embodiment, as described above, it is assumed that the communication positions requested by the game apparatus 1 are communication positions near the current position of the game apparatus 1 at which the game apparatus 1 requests the communication positions. The game apparatus 1, when requesting the communication positions, acquires the position data representing the current position from the GPS 391 and transmits the communication position request data which includes the position data as current position data to the server 5. In this manner, the communication positions near the current position of the game apparatus 1 are requested by each game apparatus 1 to the server 5.

If the server 5 receives the requests of the communication positions by receiving the communication position request data from the game apparatus 1, the server 5 generates data to transmit the communication positions to the game apparatus 1 that has requested the communication positions. For generating the data to be transmitted to the game apparatus 1, the server 5 first refers to the current position which is indicated by the current position data included in the received communication position request data. After referring to the current position of the game apparatus 1, the server 5 searches the communication positions stored in the HDD 54 for the communication positions that are included in a region having a predetermined size in which the referred current position is in the center position.

Next, the server 5 previously stores in the HDD 54 data, as map image data, which represents a map image of a region (for example, if the game apparatus 1 is sold on the domestic market, the entire domestic region) in which the game apparatuses 1 of the present system possibly exist. The server 5 then crops out, from an image represented by the map image data, an image of a map corresponding to the region, based on the current position, having the predetermined size and which is referred to when the server 5 receives the communication position request data. The map image data also includes data (hereinafter, referred to as correspondence data) which indicates latitude and longitude on the map represented by the map image represented by the map image data and two-dimensional coordinates (typically, X-Y coordinates) of the map image corresponding to each other. After cropping out the map image, the server 5 performs a process of generating an image (an image on which respective images representing the communication positions is superimposed) as the communication position image, in which the searched communication positions are plotted on the cropped map image. At this time, while referring to the correspondence data, the server 5 plots the searched communication positions so as to correspond to the two-dimensional coordinates of the map image cropped out.

After generating the communication position image data, the server 5 transmits the generated communication position image data to the game apparatus 1 that has requested the communication positions. This is the description of the outline of the server process. Next, an outline of a communication position display process for the game apparatus 1 to display the communication positions will be described.

[Communication Position Display Process]

In the present embodiment, as an example, the game apparatus 1 requests the communication positions as described above when a program (a communication position display program) for displaying the communication positions on the LCD 38 is executed in the game apparatus 1. When the communication position display program is executed in the game apparatus 1, the communication position request data described above is first generated and transmitted to the server 5. Next, the communication position image data which is transmitted from the server 5 in response to the communication position request data is received and stored in the main memory 32. The communication position image data is stored in the main memory 32, and the communication position image represented by the data is displayed on the LCD 38.

This allows the user of the game apparatus 1 to know the positions, at which the automatic wireless communication is performed, near the current position where the user caused the game apparatus 1 to execute the communication position display program. In addition, by knowing the positions at which the automatic wireless communication is performed, the user can go to a position at which the automatic wireless communication can highly likely be performed to enhance the possibility to obtain the pleasure as described in the outline of the automatic wireless communication. The data communication between the game apparatuses 1 in the present system can thus be facilitated.

This is the outline of the communication position display process performed by each game apparatus 1 of the present system. Next, data and programs to be stored in the main memory 32 of each game apparatus 1 in the present system will be described.

[Data to be Stored in Main Memory 32]

Figure 5:
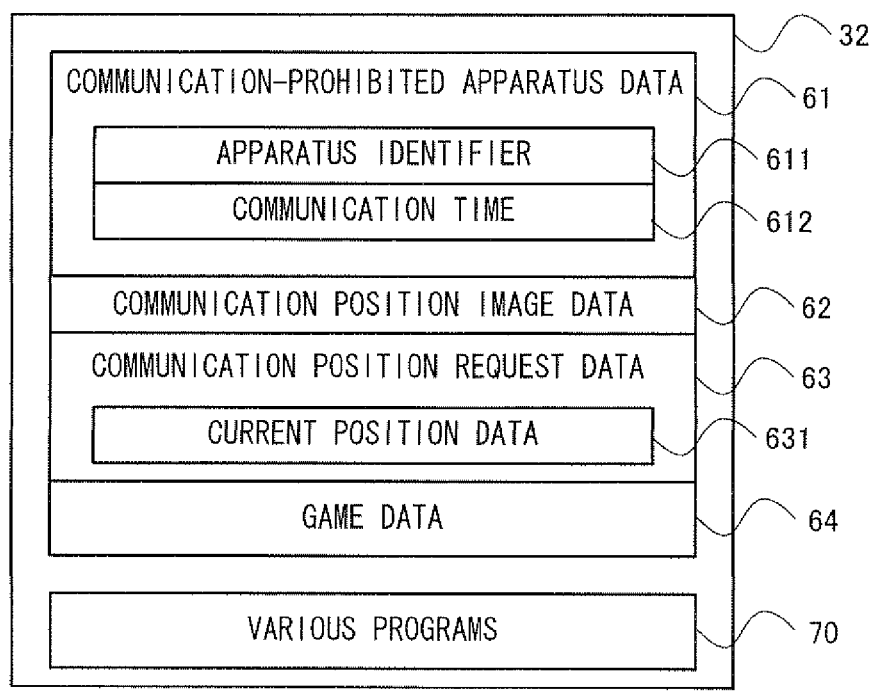
FIG. 5 is a diagram showing an example of data stored in a main memory of the game apparatus according to the present invention.

FIG. 5 is a diagram showing an example of data and programs to be stored in the main memory 32 of each game apparatus 1 according to the present embodiment. The main memory 32 stores therein communication-prohibited apparatus data 61, communication position image data 62, communication position request data 63, game data 64, and various programs 70. Among the data and programs shown in FIG. 5, the data is data which is generated or stored in accordance with the CPU 311 executing the various programs 70. Among the data and programs shown in FIG. 5, the programs are programs which are loaded from the external memory 39 or the internal data storage memory 33, according to need, when the CPU 311 executes the programs, respectively.

The communication-prohibited apparatus data 61 is used to prevent the CPU 311 from transmitting and receiving overlapping data in a short time period in the automatic wireless communication with the same game apparatus 1. As shown by way of example in FIG. 5, the communication-prohibited apparatus data 61 includes an apparatus identifier 611 and a communication time 612. The apparatus identifier 611 is an identifier for uniquely identifying the game apparatus 1 of the communication partner to/from which data is transmitted/received through the automatic wireless communication. In the present embodiment, the use of a MAC address as an example of the apparatus identifier 611 is assumed. As will be apparent, the apparatus identifier 611 is transmitted from the game apparatus 1 of the communication partner when the automatic wireless communication is performed. The communication time 612 indicates time at which the automatic wireless communication is performed with the game apparatus 1 indicated by the apparatus identifier 611.

The communication-prohibited apparatus data 61 is generated as data which indicates the apparatus identifier 611 identifying the communication partner when the automatic wireless communication is performed and the communication time 612 at which the automatic wireless communication is performed, associating with each other. In the example shown in FIG. 5, a case where a piece of the communication-prohibited apparatus data 61 is stored in the main memory 32 is also shown. However, each time the automatic wireless communication is performed, one or more pieces of the communication-prohibited apparatus data 61 are stored, in the main memory 32, as the data which indicates the communication time 612 and the apparatus identifier 611 identifying the communication partner, associating with each other. Then, as will be apparent, the communication-prohibited apparatus data 61, which includes the communication time 612 the elapsed time therefrom until the main memory 32 is referred to is longer than a predetermined time period (hereinafter, referred to as communication-prohibited time period), is deleted from the main memory 32. This allows the prohibition of the automatic wireless communication with the game apparatus 1 identified by the apparatus identifier 611 included in the communication-prohibited apparatus data 61 stored in the main memory 32, until the communication-prohibited time period has elapsed.

The communication position image data 62 is data which the server 5 transmits as described above which is received and stored in the main memory 32.

The communication position request data 63 is data which is used for the game apparatus 1 to request the communication positions from the server 5 as described above. As shown by way of example in FIG. 5, the communication position request data 63 includes current position data 631. The current position data 631 is data which indicates the current position when the game apparatus 1 requests the communication positions as described above, and is position data which is acquired from the GPS 391 when the communication position request data 63 is generated. The communication position request data 63 is generated when the above-described communication position display program is executed, and is stored in the main memory 32.

The game data 64 is various types of data which is generated in accordance with the above-described game program being executed.

The various programs 70 are various types of programs which are executed by the CPU 311. For example, the above-described game program, an automatic wireless communication program, a communication position display program, and the like are stored as the various programs 70 in the main memory 32.

This is the description of the data which is stored in the main memory 32 of the game apparatus 1 in the present system. Next, data to be stored in the internal data storage memory 33 of the game apparatus 1 in the present system will be described.

[Data to be Stored in Internal Data Storage Memory 33]

Figure 6:
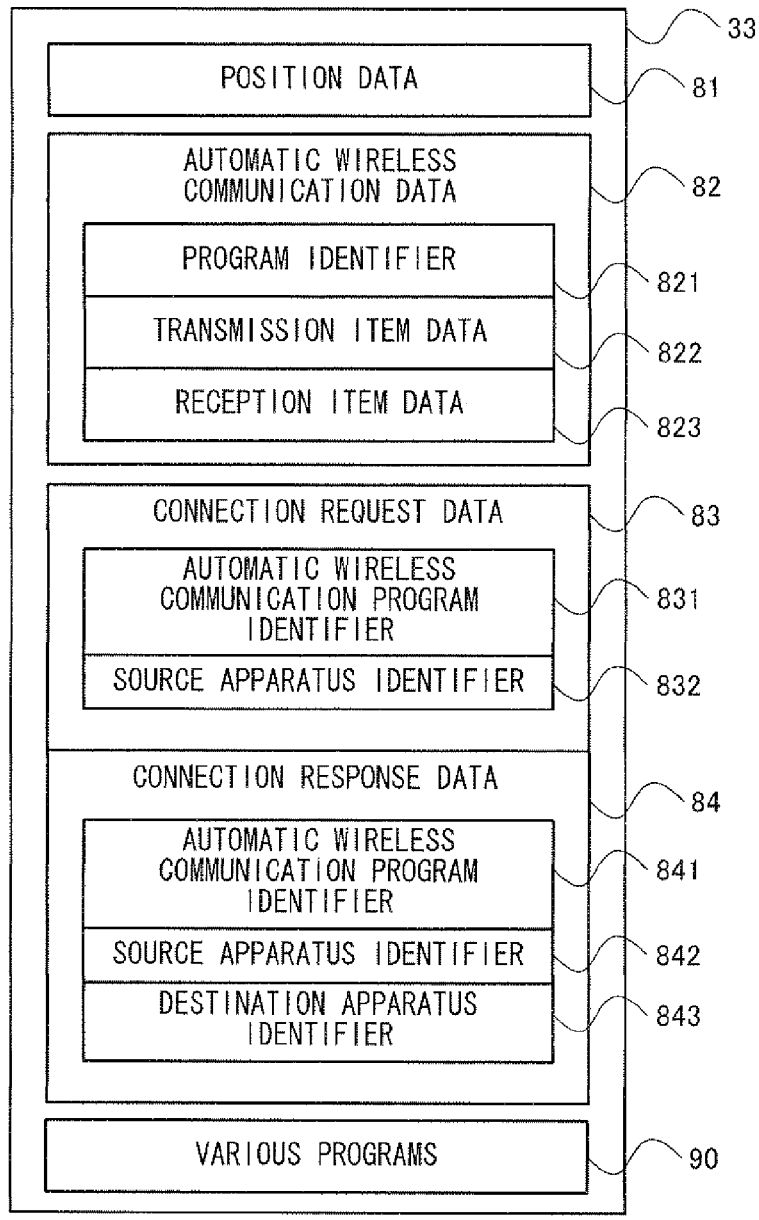
FIG. 6 is a diagram showing an example of data stored in an internal data storage memory of the game apparatus according to the present invention.

FIG. 6 is a diagram showing an example of data and programs to be stored in the internal data storage memory 33 of each game apparatus 1 according to the present embodiment. The internal data storage memory 33 stores therein position data 81, automatic wireless communication data 82, connection request data 83, connection response data 84, and various programs 90. Among the data and programs shown in FIG. 6, the data is data which is generated or stored in accordance with the programs being executed by the CPU 311. Moreover, among the data and programs shown in FIG. 6, the programs are programs which are loaded from the internal data storage memory 33 into the main memory 32, according to need, when the CPU 311 executes the programs, respectively.

The position data 81 is the position data acquired from the GPS 391 when the automatic wireless communication is performed.

The automatic wireless communication data 82 includes a program identifier 821, transmission item data 822, and reception item data 823. The automatic wireless communication data 82 is data which is stored in the internal data storage memory 33 and is used for transmitting and receiving the above-described item data thorough the automatic wireless communication. The program identifier 821 is an identifier for identifying the game program which handles the transmission item data 822 and the reception item data 823 which are included in the same automatic wireless communication data 82. The transmission item data 822 is data which indicates an item specified by the user as described above. The reception item data 823 is data which is stored in the internal data storage memory 33, as item data received from another game apparatus 1 by the automatic wireless communication being performed.

Each time a new game program is executed in the game apparatus 1, the automatic wireless communication data 82 is newly generated as data which includes the program identifier 821 identifying the new game program, and stored in the internal data storage memory 33. Therefore, while the internal data storage memory 33 is shown by way of example in FIG. 6 in which one piece of automatic wireless communication data 82 is stored, one or more pieces of the automatic wireless communication data 82 are stored in the internal data storage memory 33. The new automatic wireless communication data 82 is generated so as to include the transmission item data 822 and the reception item data 823 each indicating Null. If the user specifies an item as described above when the game program is executed, the transmission item data 822 is updated so as to indicate the specified item. The transmission item data 822 updated at this point is the transmission item data 822 that is included in the automatic wireless communication data 82 which includes the program identifier 821 identifying the game program in execution. Furthermore, when the item data is received from another game apparatus 1 by the automatic wireless communication being executed, the reception item data 823 is updated so as to indicate the item data. The reception item data 823 updated at this point is the reception item data 823 which is included in the automatic wireless communication data 82 which includes the program identifier 821 identifying the game program that handles the received item data.

The connection request data 83 is data for requesting transmission/reception of the item data from another game apparatus 1 through the automatic wireless communication. The connection request data 83 includes an automatic wireless communication program identifier 831 and a source apparatus identifier 832. The automatic wireless communication program identifier 831 is data which indicates the program identifier 821 included in all the automatic wireless communication data 82 that is stored in the internal data storage memory 33. The source apparatus identifier 832 is an identifier for uniquely identifying the own game apparatus 1. In the present embodiment, the use of a MAC address of the own game apparatus 1 as an example of the source apparatus identifier 832 is assumed. The connection request data 83 is loaded from the internal data storage memory 33 when the CPU 311 searches for the communication partner of the automatic wireless communication, and is transmitted as a frame, by using the wireless communication module 34.

The connection response data 84 is data which indicates a response to the above-described connection request data 83 transmitted from another game apparatus 1. The connection response data 84 includes an automatic wireless communication program identifier 841, a source apparatus identifier 842, and a destination apparatus identifier 843. Similarly to the above-described automatic wireless communication program identifier 831, the automatic wireless communication program identifier 841 is data which indicates all the program identifier 821. Similarly to the above-described source apparatus identifier 832, the source apparatus identifier 842 is an identifier for uniquely identifying the own game apparatus 1. In the present embodiment, the use of a MAC address of the own game apparatus 1 as an example of the source apparatus identifier 842 is assumed as similar to the source apparatus identifier 832. The destination apparatus identifier 843 is an identifier for uniquely identifying the other game apparatus 1 to which the connection response data 84 is transmitted. As will be apparent, the destination apparatus identifier 843 is the same identifier as the source apparatus identifier 832 of the other game apparatus 1 that is included in the connection request data 83 transmitted from the other game apparatus 1.

Therefore, in the present embodiment, the destination apparatus identifier 843 is the MAC address of the other game apparatus 1 to which the connection response data 84 is transmitted.

The various programs 90 are various types of programs which are executed by the CPU 311. For example, the above-described automatic wireless communication program and communication position display program are stored as the various programs 90 in the internal data storage memory 33.

This is the description of the data to be stored in the internal data storage memory 33 of each game apparatus 1 of the present system. Next, data and programs to be stored in the main memory 52 of the server 5 will be described.

[Data to be Stored in Main Memory 52]

Figure 7:
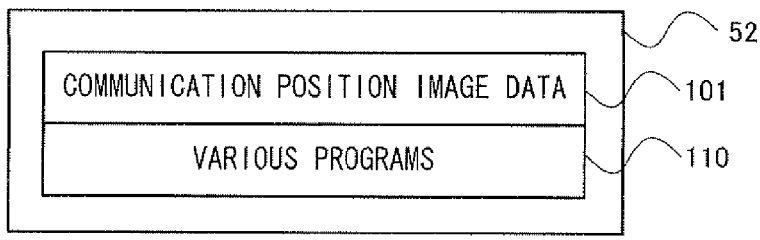
FIG. 7 is a diagram showing an example of data stored in a main memory of the server according to the present invention.

FIG. 7 is a diagram showing an example of data and programs to be stored in the main memory 52 of the server 5 according to the present embodiment. The main memory 52 stores therein communication position image data 101 and various programs 110. Among the data and programs shown in FIG. 7, the data is data which is generated in accordance with the programs being executed by the CPU 51. Among the data and programs shown in FIG. 7, the programs are programs which are loaded from the HDD 54, according to need, when the CPU 51 executes the programs, respectively.

The communication position image data 101 is data which is generated by the CPU 51 in accordance with the communication position request data 63 transmitted from the game apparatus 1 as described above.

The various programs 110 are programs which are executed by the CPU 51. For example, a program (hereinafter, referred to as server process program), which causes the CPU 51 to execute the above-described server process, is stored as the various programs 110 in the main memory 52.

This is the description of the data and programs to be stored in the main memory 52 of the server 5 of the present system. Next, data and programs to be stored in the HDD 54 of the server 5 will be described.

[Data to be Stored in HDD 54]

FIG. 8 is a diagram showing an example of data and programs to be stored in the HDD 54 of the server 5 according to the present embodiment. The HDD 54 stores therein server-managed position data 111, map image data 112, and various programs 120. Among the data and programs shown in FIG. 8, the server-managed position data 111 is data which is generated and accumulated, in accordance with the above programs being executed by the CPU 51. Among the data and programs shown in FIG. 8, the map image data 112 is previously stored data. Among the data and programs shown in FIG. 8, the programs are programs which are loaded from the HDD 54 into the main memory 52, according to need, when the CPU 51 executes the programs, respectively.

The server-managed position data 111 is data in which the communication positions indicated by the position data 81 transmitted from each game apparatus 1 of the present system is accumulated and stored.

The map image data 112 is data which indicates the map image used for generating the communication position image data 101 obtained by cropping out the map image. As described above, if the game apparatus 1 is, for example, sold on the domestic market, data which indicates the map image of the entire domestic region may be assumed to be the map image data 112.

The various programs 120 are various types of programs which are executed by the CPU 51. For example, the above-described server process program is stored as the various programs 120 in the HDD 54.

This is the description of the example of the data and programs to be stored in the HDD 54 of the server 5 according to the present embodiment. Next, an operation of the CPU 311 of the game apparatus 1 and an operation of the CPU 51 of the server 5, according to the present embodiment, will be described in detail.

[Automatic Wireless Communication Program]

Figure 9:
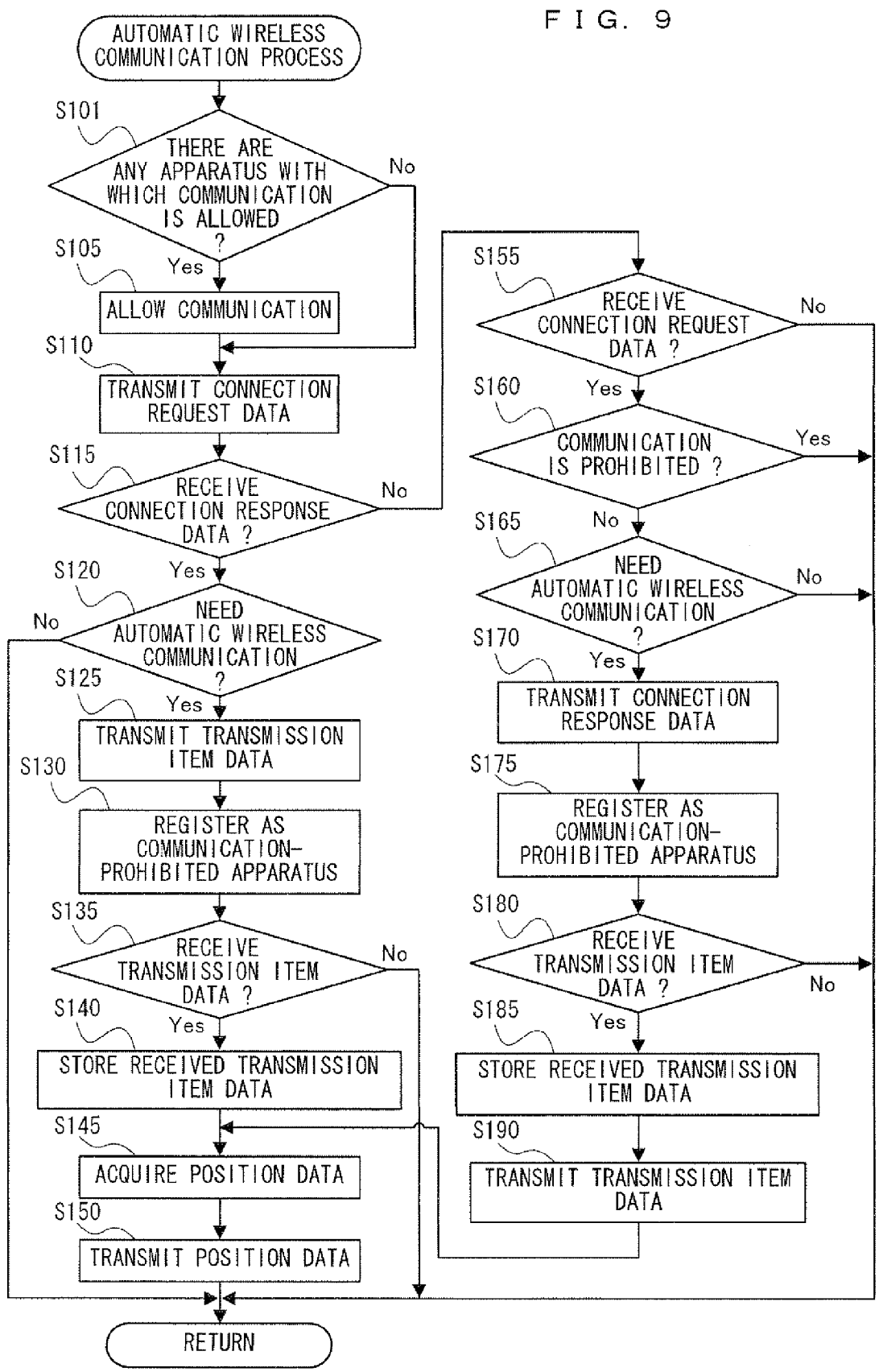
FIG. 9 is a diagram showing an example of a flowchart of an automatic wireless communication process which is performed by a CPU of the game apparatus according to the present invention executing an automatic wireless communication program.

To begin with, an operation, which is performed when the CPU 311 of the game apparatus 1 executes the automatic wireless communication program, will be described in detail. First, when the game apparatus 1 is turned on, a boot program (not shown) is executed by the CPU 311, which loads the automatic wireless communication program stored in the internal data storage memory 33 to be stored in the main memory 32. The automatic wireless communication program stored in the main memory 32 is then executed by the CPU 311 and therefore, a process shown in a flowchart in FIG. 9 is executed. FIG. 9 is a flowchart showing an example of an automatic wireless communication process which is executed by the CPU 311 executing the automatic wireless communication program. It is assumed that, as described above, the automatic wireless communication program is continuously and repeatedly executed as long as the game apparatus 1 is turned on. In FIG. 9, process steps are each abbreviated as "S".

When the automatic wireless communication process starts, the CPU 311 first determines whether there is another game apparatus 1 with which the communication is allowed (step S101). Specifically, the CPU 311 refers to the main memory 32 to determine whether the communication-prohibited apparatus data 61, which includes the communication time 612 the elapsed time therefrom until the current time is longer than the communication-prohibited time period, is stored. If there is corresponding communication-prohibited apparatus data 61, the CPU 311 determines in step S101 that there is another game apparatus 1 with which the communication is allowed (Yes in step S101). On the other hand, if there is no corresponding communication-prohibited apparatus data 61, the CPU 311 determines in step S101 that there is no other game apparatus 1 with which the communication is allowed (No in step S101).

If the CPU 311 determines that there is another game apparatus 1 with which the communication is allowed (Yes in step S101), the CPU 311 allows the communication with the other game apparatus 1 (step S105). Specifically, the CPU 311 deletes from the main memory 32 the communication-prohibited apparatus data 61 that includes the communication time 612 corresponding to the determination conducted in step S101. The communication-prohibited apparatus data 61, which is deleted as described above since the communication-prohibited time period has elapsed, does no longer correspond to the determination to be conducted in the next step S101, and therefore the communication is allowed with the game apparatus 1 which has the apparatus identifier 611 that is included in the communication-prohibited apparatus data 61. Thus the communication becomes again available.

If the CPU 311 determines that there is no game apparatuses 1 with which the communication is allowed (No in step S101) or allows the communication (step S105), the CPU 311 transmits the connection request data 83 by broadcasting, using the wireless communication module 34 (step S110). After transmitting the connection request data 83, the CPU 311 determines whether it has received the connection response data 84 from another game apparatus 1, while waiting for a predetermined length of time (hereinafter, referred to as connection response waiting time) (step S115).

Here, among the process steps shown in the flowchart of FIG. 9, process steps of step S120 through step S140 correspond to the process in the case where the CPU 311 has received the connection response data 84 from another game apparatus 1. On the other hand, among the process steps shown in the flowchart of FIG. 9, process steps of step S155 through step S190 correspond to the case where the CPU 311 receives the connection request data 83 from another game apparatus 1. In the following, the process in the case where the CPU 311 has received the connection response data 84 from another game apparatus 1 will be described.

If the CPU 311 determines that it has received the connection response data 84 (Yes in step S115), the CPU 311 determines whether there is need for performing the automatic wireless communication with the other game apparatus 1 that has transmitted the connection response data 84 (step S120). Specifically, the CPU 311 determines whether the internal data storage memory 33 stores therein the automatic wireless communication data 82 which includes the program identifier 821 corresponding to any program identifier indicated by the automatic wireless communication program identifier 841 included in the received connection response data 84. If the internal data storage memory 33 stores the corresponding automatic wireless communication data 82, the CPU 311 determines that there is need for performing the automatic wireless communication (Yes in step S120). On the other hand, if the internal data storage memory 33 does not store therein the corresponding automatic wireless communication data 82, the CPU 311 determines that there is no need for performing the automatic wireless communication (No in step S120).

If the CPU 311 determines that there is need for performing the automatic wireless communication (Yes in step S120), the CPU 311 transmits the transmission item data 822 (step S125). Specifically, the CPU 311 transmits the program identifier 821 and the transmission item data 822, which are included in the automatic wireless communication data 82 corresponding to the determination conducted in step S120, to the other game apparatus 1 indicated by the source apparatus identifier 842 included in the connection response data 84 which was determined to be received in step S115, which transmits, to the other game apparatus 1 which has executed the game program, data indicative of the item specified by the user in the game program indicated by the program identifier 821 included in the corresponding automatic wireless communication data 82.

After transmitting the transmission item data 822, the CPU 311 registers the other game apparatus 1, to which the transmission item data 822 has been transmitted, as a communication-prohibited apparatus (step S130). Specifically, the CPU 311 regards the source apparatus identifier 842, which is included in the connection response data 84 which was determined to be received in step S115, as the apparatus identifier 611. The CPU 311 then generates the communication-prohibited apparatus data 61 which includes the apparatus identifier 611 and the communication time 612 at which the transmission item data 822 is transmitted, and stores the generated data in the main memory 32.

After registering the communication-prohibited apparatus, the CPU 311 determines whether it has received the transmission item data 822 which is transmitted from the destination of the transmission item data 822, while waiting through a predetermined length of time (hereinafter, referred to as data waiting time) (step S135).

If the CPU 311 determines that it has received the transmission item data 822 (Yes in step S135), the CPU 311 stores the received transmission item data 822 (step S140). Specifically, when storing the transmission item data 822, the CPU 311 refers to the main memory 32 to search for the automatic wireless communication data 82 which includes the program identifier 821 which is transmitted together with the transmission item data 822 as described above. The CPU 311 then updates the reception item data 823 included in the found automatic wireless communication data 82 by the received transmission item data 822.

On the other hand, if the CPU 311 determines that it does not receive the transmission item data 822 (No in step S135), the CPU 311 assumes that the automatic wireless communication with the source of the connection response data 84 received in step S115 is interrupted for some reason, and therefore repeats the process from the start.

Next, the case where the CPU 311 receives the connection request data 83 from the other game apparatus 1 will be described. If the CPU 311 determines that it does not receive the connection response data 84 (No in step S115), the CPU 311 determines whether it has received the connection request data 83 from another game apparatus 1, while waiting through a predetermined length of time (hereinafter, referred to as connection request waiting time) (step S155).

If the CPU 311 determines that it has received the connection request data 83 (Yes in step S155), the CPU 311 determines whether the communication with the other game apparatus 1, which has transmitted the connection request data 83, is prohibited (step S160). Specifically, the CPU 311 refers to the main memory 32 to determine whether the communication-prohibited apparatus data 61 which includes, as the apparatus identifier 611, the source apparatus identifier 832 included in the connection request data 83 which was determined to be received in step S155 is stored in the main memory 32. In the case where the corresponding communication-prohibited apparatus data 61 is stored in the main memory 32, the CPU 311 determines that the communication with the other game apparatus 1 that has transmitted the connection request data 83 is prohibited (Yes in step S160). On the other hand, if there is no corresponding communication-prohibited apparatus data 61 stored in the main memory 32, the CPU 311 determines that the communication with the other game apparatus 1 that has transmitted the connection request data 83 is not prohibited (No in step S160).

If the CPU 311 determines that the communication is not prohibited (No in step S160), the CPU 311 determines whether there is need for performing the automatic wireless communication with the other game apparatus 1 that has transmitted the connection request data 83 which was determined to be received in step S155 (step S165). Specifically, the CPU 311 determines whether the internal data storage memory 33 stores therein the automatic wireless communication data 82 which includes the program identifier 821 corresponding to any program identifier indicated by the automatic wireless communication program identifier 831 included in the received connection request data 83. In the case where the corresponding automatic wireless communication data 82 is stored in the internal data storage memory 33, the CPU 311 determines that there is need for performing the automatic wireless communication (Yes in step S165). On the other hand, in the case where no corresponding automatic wireless communication data 82 is stored in the internal data storage memory 33, the CPU 311 determines that there is no need for performing the automatic wireless communication (No in step S165).

If the CPU 311 determines that there is need for performing the automatic wireless communication (Yes in step S165), the CPU 311 transmits the connection response data 84 (step S170). Specifically, the CPU 311 transmits the connection response data 84 to the other game apparatus 1 identified by the source apparatus identifier 832 included in the connection request data 83 which was determined to be received in step S155.

After transmitting the connection response data 84, the CPU 311 registers the other game apparatus 1, to which the connection response data 84 has been transmitted, as the communication-prohibited apparatus (step S175). Specifically, the CPU 311 regards the source apparatus identifier 832, which is included in the connection request data 83 which is determined to be received in step S155, as the apparatus identifier 611. The CPU 311 then generates the communication-prohibited apparatus data 61 which includes the apparatus identifier 611 and the communication time 612, at which the connection response data 84 is transmitted, and stores the generated data in the main memory 32.

After registering the communication-prohibited apparatus, the CPU 311 determines whether it has received the transmission item data 822 from the destination of the connection response data 84, while waiting through the data waiting time (step S180).

If the CPU 311 determines that it has received the transmission item data 822 (Yes in step S180), the CPU 311 stores the received transmission item data 822 (step S185). Specifically, when storing the transmission item data 822, the CPU 311 refers to the main memory 32 to search for the automatic wireless communication data 82 that includes the program identifier 821 transmitted together with the transmission item data 822 as described above. The CPU 311 then updates the reception item data 823 included in the automatic wireless communication data 82 found from the searching, by the received transmission item data 822.

After storing the received transmission item data 822, the CPU 311 transmits the transmission item data 822 included in the automatic wireless communication data 82 found from the searching in step S185, together with the program identifier 821 included in the automatic wireless communication data 82 (step S190).

On the other hand, if the CPU 311 determines that it does not receive the transmission item data 822 (No in step S180), the CPU 311 assumes that the automatic wireless communication with the source of the connection request data 83, which was determined to be received in step S155, is interrupted for some reason, and therefore repeats the process from the start.

As described above, when either of the process steps (step S120 through step S140) for the case where the CPU 311 has received the connection response data 84 from another game apparatus 1 and the process steps (step S155 through step S190) for the case where the CPU 311 receives the connection request data 83 from another game apparatus 1 is completed, the CPU 311 acquires from the GPS 391 the position data 81 indicative of a position of the own game apparatus 1 when the automatic wireless communication is performed, and stores the acquired position data 81 in the internal data storage memory 33 (step S145). After storing the position data 81, the CPU 311 transmits the stored position data 81 to the server 5 (step S150).

This is the description of the example of the automatic wireless communication process according to the present embodiment.

In order for the CPU 311 to transmit the position data 81, the above-described automatic communication program may be configured as described in the following. More specifically, the AP2 according to the present embodiment, typically, periodically transmits beacon data for notifying the game apparatus 1 present within the communicable range of the existence of itself. Therefore, the automatic wireless communication program is configured such that, if the CPU 311 waits as long as the connection request waiting time in the process of step S155 of the above-described automatic wireless communication program and fails to receive the connection request data 83, the CPU 311 further waits to receive the beacon data. The time for which the CPU 311 waits for the beacon data is assumed to be a predetermined length of time (hereinafter, referred to as beacon data waiting time). The automatic wireless communication program is configured such that, in the case where the CPU 311 determines that it has received the beacon data, the CPU 311 transmits response data, which indicates that the CPU 311 has received the beacon data, to the AP2 that has transmitted the beacon data. Typically, when the AP2 has received the response data, the AP2 transmits data indicative of the allowance of data transmission to the game apparatus 1 which the response data is transmitted from. Therefore, the automatic wireless communication program can be configured such that, when the CPU 311 has received the data indicative of the allowance of data transmission, the CPU 311 transmits the position data 81 stored in the internal data storage memory 33. Thus configuring the automatic wireless communication program allows each game apparatus 1 to automatically transmit the position data 81 to the server 5 via the AP2 when there are the AP2 within the communicable range. Therefore, if the position at which the game apparatus 1 performs the automatic wireless communication is within the range communicable with the AP2, the game apparatus 1 is able to instantly transmit the position data 81 indicative of the communication position to the server 5 via the AP2. Also, the automatic wireless communication program may be configured such that, if the position at which the game apparatus 1 performs the automatic wireless communication is not within the range communicable with the AP2, the game apparatus 1 accumulates and stores the position data 81, which indicates the communication position failed to be transmitted, in the internal data storage memory 33. This allows, when each game apparatus 1 has moved into the range communicable with the AP2, the game apparatus 1 to automatically and collectively transmit to the server 5 the position data 81 accumulated when the position at which the game apparatus 1 performs the automatic wireless communication is not within the range communicable with the AP2.

Also, in the case of causing the game apparatus 1 to execute the automatic wireless communication program modified as described above, parent-child relationship between the game apparatuses 1 executing the automatic wireless communication therebetween may be defined. Specifically, the automatic wireless communication program may be configured such that, when the game apparatuses 1 start the automatic wireless communication therebetween, the game apparatus 1 that starts the automatic wireless communication by transmitting the connection request data 83 is defined as a parent side and the game apparatus 1 that transmits the connection response data 84 in response to the reception of the connection request data 83 and then starts the automatic wireless communication is defined as a child side.

Also, the transmission of the position data 81 indicative of the position of the game apparatus 1 at which the automatic wireless communication is performed may be periodically and automatically executed as a task through a predetermined time period.

[Server Process Program]

Figure 10:
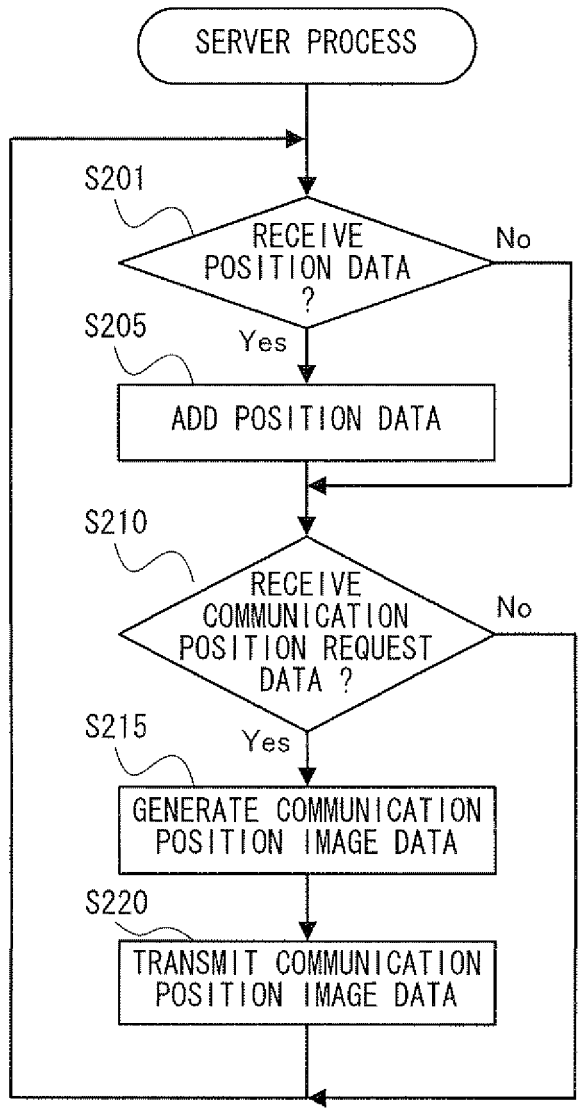
FIG. 10 is a diagram showing an example of a flowchart of a server process which is performed by a CPU of the server according to the present invention executing a server process program.

Next, an operation when the CPU 51 of the server 5 executes the server process program will be described in detail. First, when the server 5 is turned on, a boot program (not shown) is executed by the CPU 51, which loads the server process program stored in the HDD 54 to be stored in the main memory 52. The programs stored in the main memory 52 are then executed by the CPU 51, and thereby the process shown in a flowchart of FIG. 10 is performed. FIG. 10 is a flowchart showing an example of the server process performed by the CPU 51 executing the server process program. In FIG. 10, process steps are each abbreviated as "S".

When the server process starts, the CPU 51 first determines whether it has received the position data 81 from any game apparatus 1 of the present system (step S201). If the CPU 51 determines that it has received the position data 81 (Yes in step S201), the CPU 51 adds the received position data 81 as data indicative of the communication position to the server-managed position data 111 (step S205).

On the other hand, if the CPU 51 determines that it does not receive the position data Si (No in step S201), or it adds the position data 81 (step S205), the CPU 51 determines whether it has received the communication position request data 63 from any game apparatus 1 of the present system (step S210).

If the CPU 51 determines that it has received the communication position request data 63 (Yes in step S210), the CPU 51 generates the communication position image data 101 as described above (step S215). The CPU 51 then transmits the generated communication position image data 101 to the source of the communication position request data 63 (step S220).

If the CPU 51 transmits the communication position image data 101 (step S220), or determines that it does not receive the communication position request data 63 (No in step S210), the CPU 51 returns the process to step S201.

[Communication Position Display Program]

Next, an operation when the CPU 311 of the game apparatus 1 executes the communication position display program will be described in detail. First, when the game apparatus 1 is turned on, a boot program is executed by the CPU 311 as described above, which loads the automatic wireless communication program stored in the internal data storage memory 33 to be stored in the main memory 32. The CPU 311 then executes the automatic wireless communication program stored in the main memory 32.

Here, the CPU 311 executes a launcher program (not shown) in parallel with executing the automatic wireless communication program. The launcher program is a program which determines a program selected by the user from among a plurality of programs and causes the selected program to be executed. Such programs which the launcher program allows the user to select includes the game program (not shown) and any application programs (not shown) which are already stored in the internal data storage memory 33, the game program stored in the external memory 39 which is already connected to the game apparatus 1, and the like. When the launcher program is executed by the CPU 311, the user can select any program from among these programs. The communication position display program is stored in the internal data storage memory 33 as described above. Therefore, if the CPU 311 executes the launcher program, the communication position display program also becomes selectable. When the user selects any program, the CPU 311 determines the selected program, based on the operation data output from each operation button 37 operated by the user.

Figure 11:
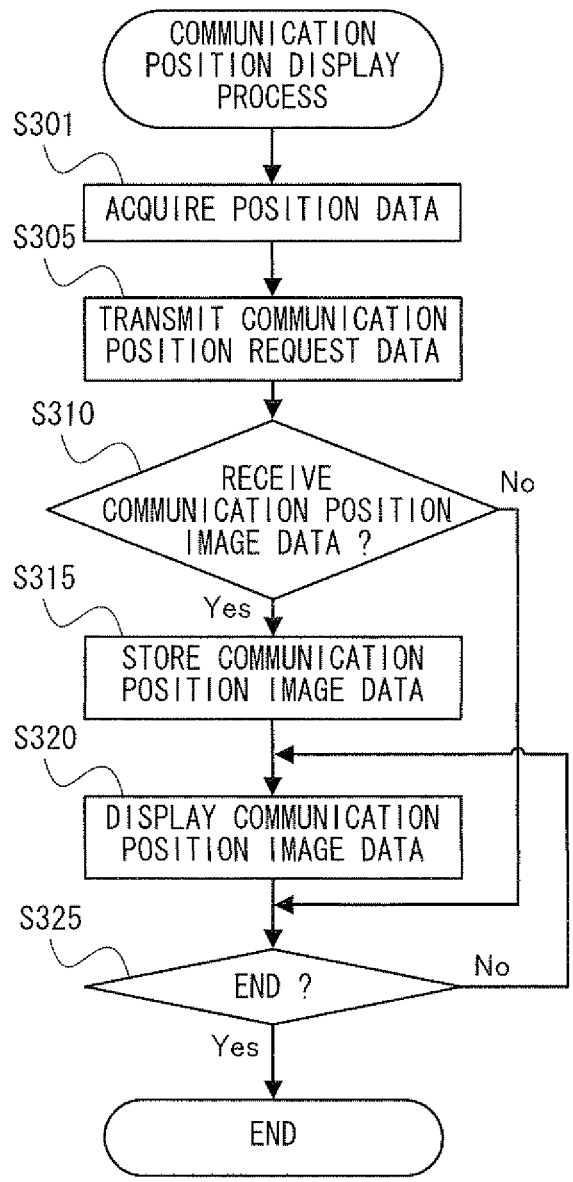
FIG. 11 is a diagram showing an example of a flowchart of a communication position display process which is performed by the CPU of the game apparatus according to the present invention executing a communication position display program.

If the user selects the communication position display program while the launcher program is being executed, the communication position display program is loaded from the internal data storage memory 33 and stored in the main memory 32. The communication position display program stored in the main memory 32 is then executed by the CPU 311, thereby the process shown in a flowchart of FIG. 11 is performed. FIG. 11 is a flowchart showing an example of the communication position display process performed by the CPU 311 executing the communication position display program. In FIG. 11, process steps are each abbreviated as "S".

When the communication position display process starts, the CPU 311 acquires the position data from the GPS 391 (step S301), generates the communication position request data 63 which includes the position data as the current position data 631 in the main memory 32, and transmits the generated communication position request data 63 to the server 5 (step S305).

After transmitting the communication position request data 63, the CPU 311 determines whether it has received the communication position image data 101 which is transmitted from the server 5 as described above in accordance with the transmission of the communication position request data 63, while waiting for a predetermined time period (step S310).

If the CPU 311 determines that it has received the communication position image data 101 (Yes in step S310), the CPU 311 stores the communication position image data 62 as data obtained by receiving the communication position image data 101 in the main memory 32 as described above (step S315). After storing the communication position image data 62 in the main memory 32, the CPU 311 displays on the LCD 38 the communication position image represented by the communication position image data 62 in the main memory 32 as described above (step S320).

After displaying the communication position image (step S320), or determining that the CPU 311 does not receive the communication position image data 101 (No in step S310), the CPU 311 determines whether the user has chosen to end the communication position display process, based on the operation data output from each operation button 37 (step S325). If the CPU 311 determines that the user has chosen to end the communication position display process (Yes in step S325), the CPU 311 ends the communication position display process. On the other hand, if the CPU 311 determines that the user does not choose to end the communication position display process (No in step S325), the CPU 311 returns the process to step S320 and continues displaying the communication position image.

In step S301, if the CPU 311 fails to transmit the communication position request data 63 for some reason, such as there is no AP2 within the communication range of the wireless communication module 34, the CPU 311 may display an image which notifies so on the LCD 38, and then ends the communication position display process.

The CPU 311 of the game apparatus 1 and the CPU 51 of the server 5 operate as described above, and thereby the user of the game apparatus 1 is able to know the position, at which the automatic wireless communication is performed, near the current position of the user. Therefore, according to the information processing system of the present embodiment, a pleasure to find a location at which the automatic wireless communication can highly likely be performed to, for example, acquire an item necessary for proceeding the game can be provided to the user.

In the embodiment described above, the case where each game apparatus 1 which makes up the information processing system 10 transmits to the server 5 the position data indicative of the current position, at which the game apparatus 1 performs the automatic wireless communication, as data indicative of the communication position, has been described by way of example. Also, in the embodiment described above, the case where, when the communication position request data 63 is transmitted from the game apparatus 1, the server 5 which makes up the information processing system 10 generates the communication position image indicative of the communication position, at which the automatic wireless communication is performed, as record information indicating the record of the automatic wireless communication performed in the information processing system 10, has been described by way of example. That is, in the embodiment described above, a description has been given by way of example in the case where each game apparatus 1 which makes up the information processing system 10 transmits to the server 5 the communication position at which the automatic wireless communication is performed, and the server 5 generates, based on the communication position, the record information indicative of the record in executing the automatic wireless communication in the information processing system 10.

[Modification 1]

Figure 12:
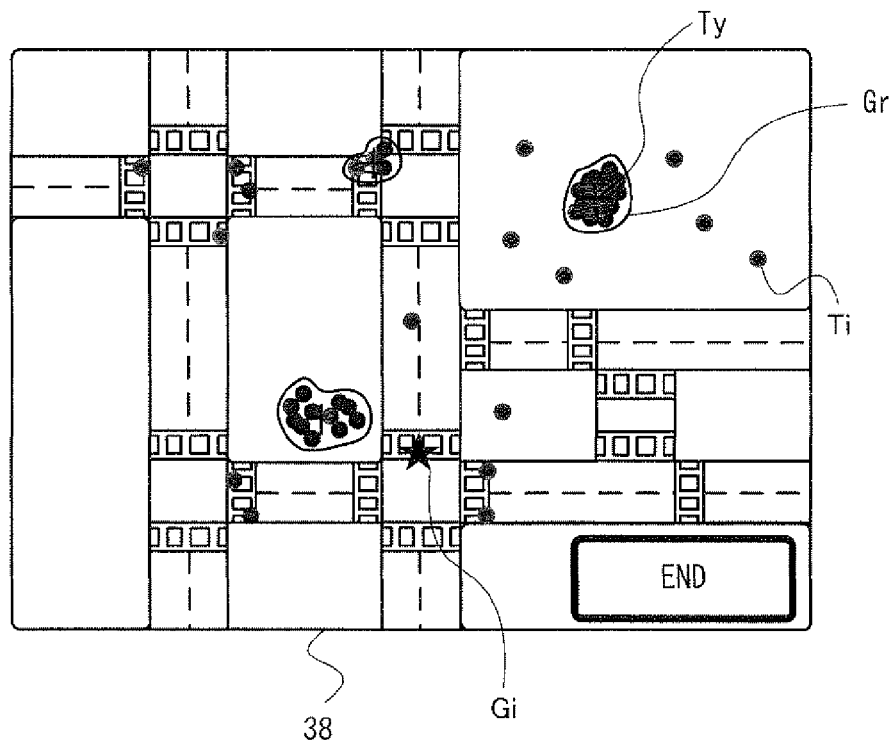
FIG. 12 is another example of a display state of the communication positions in the present invention.

In the embodiment described above, the case where the communication position image in which the respective communication positions of the game apparatuses 1 which make up the information processing system 10 are plotted on the map image is displayed, for example, as shown in FIG. 4 and thereby the distribution of the communication positions is shown, has been described by way of example. In another embodiment, however, as shown by way of example in FIG. 12, the communication positions may be grouped and displayed on the LCD 38. More specifically, from among the communication positions searched for as described above, the CPU 51 of the server 5 groups the communication positions that are within less than a predetermined distance therebetween when the CPU 51 receives the communication position request data 63 transmitted from the game apparatus 1. The CPU 51 may then generate the communication position image on which a region including therein the grouped communication positions are indicated and further superimposed. FIG. 12 shows an example of the display screen of the LCD 38 displaying the communication position image on which the region including therein the grouped communication positions is further superimposed as described above. In FIG. 12, the communication position image, on which grouped region images Gr are further superimposed, in addition to the communication positions Ti and the current position Gi in the above-described embodiment, is displayed on the LCD 38. The grouped region image Gr is an image indicative of the region formed of the grouped communication positions Ti, showing a solid border enclosing the grouped communication positions Ti. Also, the CPU 51 may generate the communication position image on which center position images Ty indicative of a center position of the grouped region image Gr are further superimposed as, for example, cross-shaped images as shown in FIG. 12. While, in FIG. 12, the symbol Gr is added merely to one solid border, the other solid borders are also assumed to be the grouped region images Gr. Similarly, while, in FIG. 12, the symbol Ty is added merely to one cross-shaped image, the other cross-shaped images are also assumed to be the center position images Ty indicative of the center positions of the grouped communication positions, respectively. When displaying the grouped region image Gr, at least either one of the communication position Ti and the center position image Ty may not be superimposed on the communication position image. Also, when displaying the center position image Ty, at least one of the communication position Ti and the grouped region image Gr may not be displayed. Also, for example, by transmitting position information (such as latitude and longitude) on the center position to a web site providing an existing map information service, a name of a building positioned at the center position of each group, a region name, an address, or the like may be acquired and further displayed. In another embodiment, by using map image data 112 which further includes information indicative of the outline of each building, the communication position image, on which an image where the outline of the building located at the center position of the group is filled by color is further superimposed, may be generated. When displaying the communication position image on which the image where the outline of the building is filled by color is further superimposed, the communication position image on which at least one of the communication position Ti, the current position Gi, the center position image Ty, and the grouped region image Gr is further superimposed, may be generated. The communication positions which are grouped by the CPU 51 of the server 5 are not limited to the communication positions that are within less than the predetermined distance therebetween, and may be the communication positions that satisfy any positional relationship. Also, the CPU 51 of the server 5 may group the communication positions, not based on the positional relationship such as the actual distance between the communication positions, but based on positional relationship on the map image. By grouping the communication positions, based on the positional relationship on the map image, the communication positions can also be optimally grouped in accordance with a map image scale. Furthermore, the image indicative of the current position Gi may be superimposed on the communication position image by the CPU 51 of the server 5, or the communication position image may be displayed such that the image indicative of the current position Gi is superimposed thereon at a position indicated by the position data 81 acquired for displaying the communication position image by the CPU 311 of the game apparatus 1.

[Modification 2]

Figure 13:
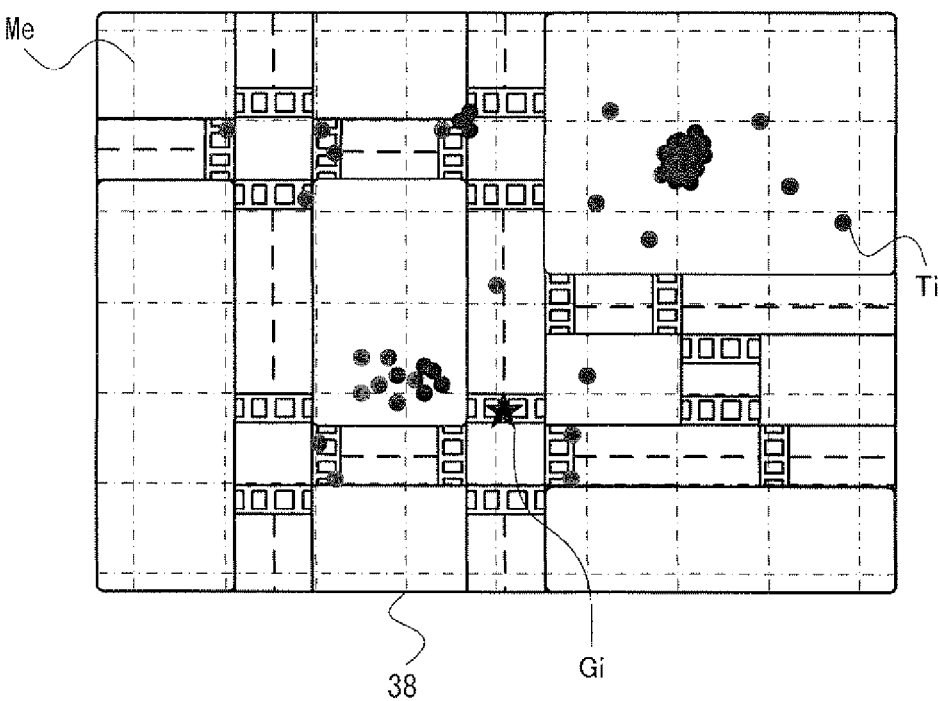
FIG. 13 is a still another example of a display state of the communication positions in the present invention.

In the embodiment described above, the case where the communication position image in which the respective communication positions of the game apparatuses 1 which make up the information processing system 10 are plotted on the map image is displayed on the LCD 38 and thereby showing the distribution of the communication positions, has been described by way of example. In another embodiment, however, as shown by way of example in FIG. 13, the communication position image, on which an image indicative of a mesh (an indicator for dividing the map into predetermined regions) is further superimposed, may be generated. The image indicative of the mesh here is an image which divides the communication position image into square-shaped regions each having a predetermined size. FIG. 13 shows an example of the display screen of the LCD 38 displaying the communication position image on which the image indicative of the mesh which divides the communication position image into square-shaped regions having the predetermined size is further superimposed as described above. In FIG. 13, the communication position image, on which a mesh image Me indicative of the mesh is superimposed, in addition to the communication position Ti and the current position Gi which are described above, is displayed on the LCD 38. The image indicated by the mesh image Me is not limited to the image which divides the communication position image into square shaped regions and may be any image if the image is a meshed image which divides the communication position image into polygonal shapes. Also, instead of the mesh image Me, any image which divides the communication position image may be displayed, such as an image indicative of one or more horizontal lines having predetermined intervals therebetween, which divides the communication position image only in the vertical direction, or an image indicative of one or more vertical lines having predetermined intervals therebetween, which divides the communication position image only in the horizontal direction. Furthermore, the mesh image Me indicative of a mesh the fineness of which is changed according to the density of the communication positions included in the entire communication position image displayed may be generated and superimposed on the communication position image.

Figure 14:
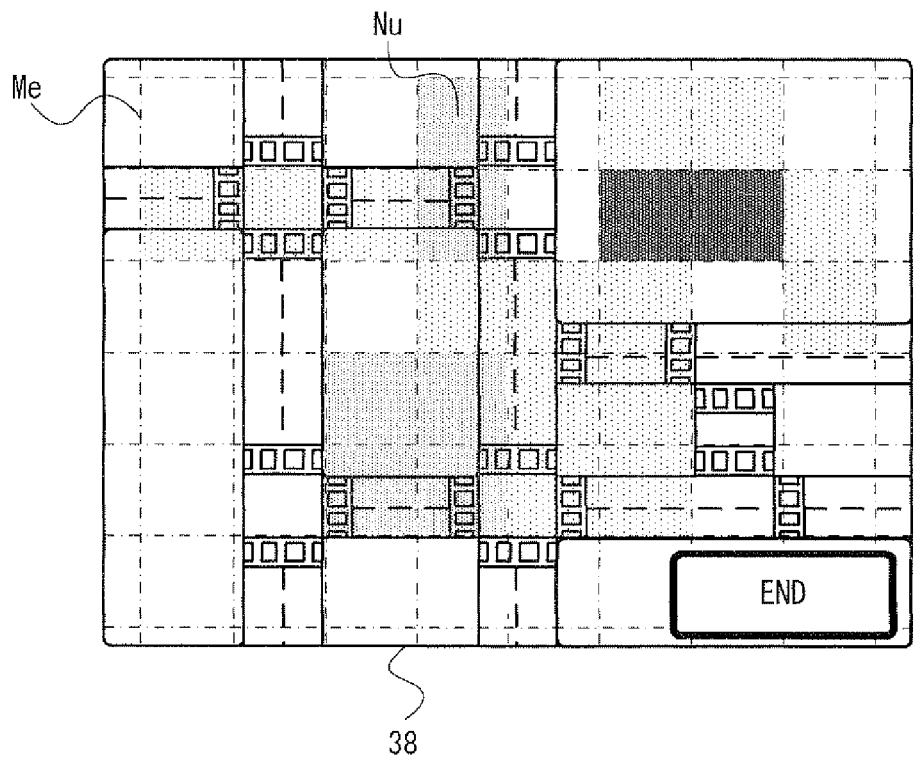
FIG. 14 is a still another example of a display state of the communication positions in the present invention.

In another embodiment in which the above-described mesh image Me is further superimposed on the communication position image, the communication position image, in which the regions into which the communication position image is divided by the mesh are classified by color according to the density of the communication positions included in each region, may be generated as shown by way of example in FIG. 14. More specifically, the CPU 51 of the server 5 calculates the density of the communication positions searched as described above for each mesh-divided region. The CPU 51 then generates the communication position image in which an image having a color depth according to the calculated density is superimposed on each mesh-divided region. FIG. 14 shows an example of the display screen of the LCD 38 displaying the communication position image in which each region is classified by color according to the density calculated for each mesh-divided region as described above. In FIG. 14, the communication position image, on which superimposed images Nu are further superimposed, in addition to the mesh image Me, is displayed on the LCD 38. The superimposed image Nu has a color according to the density of the communication positions in each region. While, in FIG. 14, the symbol Nu is added merely to the image superimposed on one region, images superimposed on the other regions are also assumed to be the images having a color according to the density of the communication positions in the mesh-divided region. When generating the communication position image on which the superimposed image Nu is superimposed, at least one of the communication position Ti, the current position Gi, the grouped region image Gr, and the center position image Ty may be superimposed on the communication position image. Also, when superimposing the superimposed image Nu on the communication position image, the mesh image Me may not necessarily be superimposed.

Figure 15:
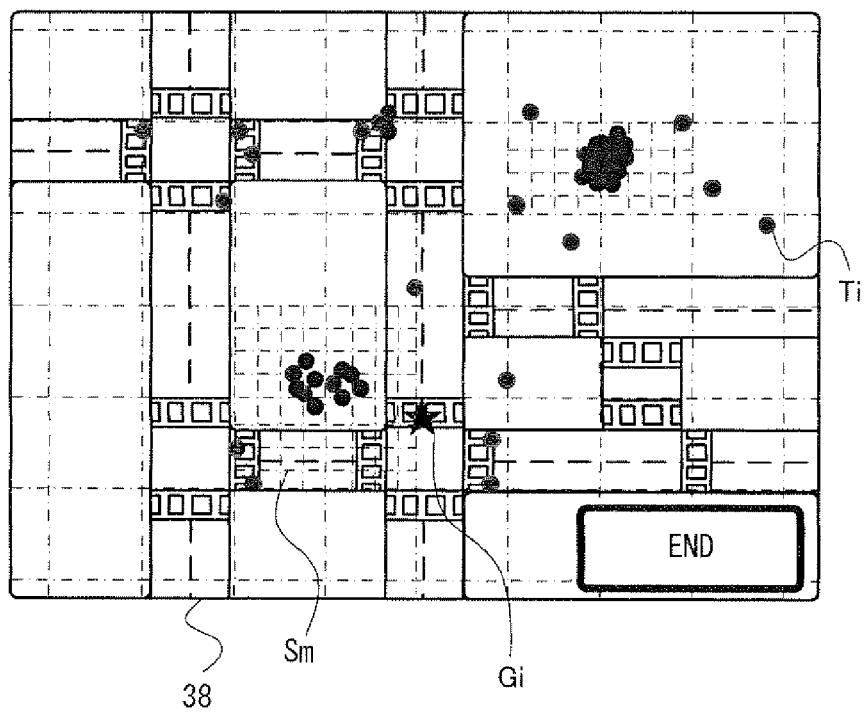
FIG. 15 is a still another example of a display state of the communication positions in the present invention.

In another embodiment which displays the mesh image Me, the communication position image, on which a mesh the fineness of which is adjusted according to the density of the communication positions included in the mesh-divided region is further superimposed, may be generated as shown by way of example in FIG. 15. More specifically, the CPU 51 of the server 5 calculates the density of the communication positions searched as described above for each mesh-divided region. The CPU 51 then generates the communication position image on which another mesh according to the calculated density is further superimposed as a submesh. FIG. 15 shows an example of the display screen of the LCD 38 displaying the communication position image on which submesh images Sm are further superimposed as described above. The submesh image Sm indicates a submesh having the fineness according to the density calculated for each mesh-divided region. In FIG. 15, the communication position image, on which the submesh image Sm indicative of the submesh adjusted so as to have higher fineness as the density of the communication positions in each region becomes higher is further superimposed, in addition to the mesh image Me, is displayed on the LCD 38. The submesh image Sm may not necessarily, but preferably be superimposed on the communication position image together with the mesh image Me. Furthermore, in the case of displaying the submesh image Sm, if the communication position Ti is further displayed, the communication position image may be generated such that at least one of the current position Gi, the grouped region image Gr, and the center position image Ty is superimposed thereon. When generating the communication position image on which the submesh image Sm and the mesh image Me are superimposed, the superimposed image Nu may further be superimposed on the communication position image. Also, the region on which the submesh image Sm is superimposed may be a region having the density calculated as described above the value of which is greater than a predetermined threshold value.

[Modification 3]

Figure 16:
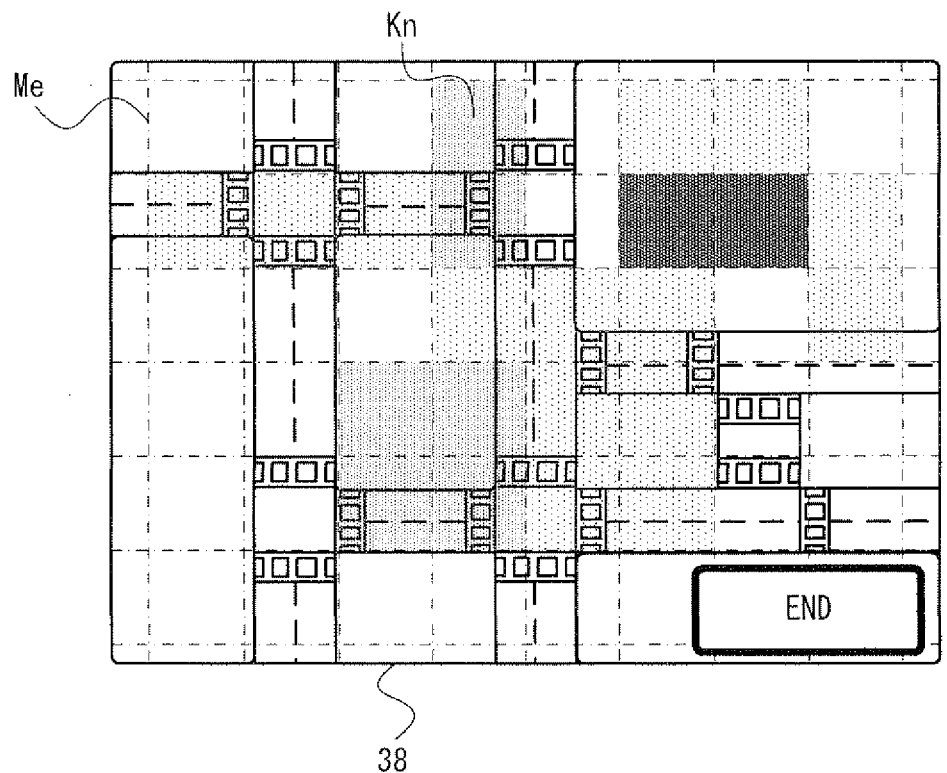
FIG. 16 is a still another example of a display state of the communication positions in the present invention.

In another embodiment, as shown by way of example in FIG. 16, the number of communication positions included in a predetermined region is calculated as communication count of the communications performed in the region, and the communication position image indicative of the distribution of the communication count may be generated. More specifically, the CPU 51 of the server 5 calculates, for example, the number of communication positions in each mesh-divided region as the communication count in the region, based on the communication positions searched as described above. The CPU 51 then generates the communication position image in which each mesh-divided region is classified by color according to the calculated communication count in the region. FIG. 16 shows an example of the display screen of the LCD 38 displaying the communication position image, on which images classifying the predetermined regions by color according to the communication count calculated for each predetermined region, are further superimposed as described above. In FIG. 16, the communication position image, on which the mesh image Me as an image indicative of the predetermined region is superimposed and communication count images Kn each of which indicates each region by color according to the communication count in the region, are further superimposed, is displayed on the LCD 38. While, in FIG. 16, the symbol Kn is added merely to the communication count image superimposed on one region, the communication count images superimposed on the other regions are also assumed to be the images having the color according to the density of the communication count in the mesh-divided region. When generating the communication position image on which the communication count image Kn is further superimposed, at least one of the communication position Ti, the current position Gi, the grouped region image Gr, and the center position image Ty may be further superimposed on the communication position image. Also, if the communication count image on which the communication count image Kn is further superimposed is generated, the mesh image Me may not necessarily be superimposed.

[Modification 4]

Figure 17:
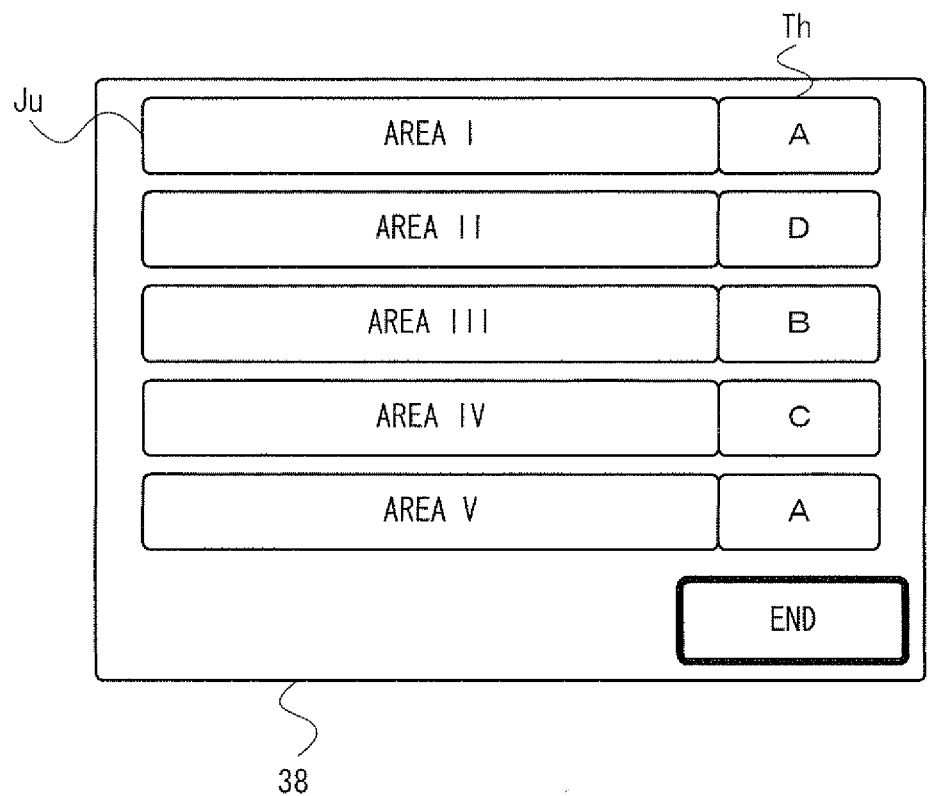
FIG. 17 is a still another example of a display state of the communication positions in the present invention.

In another embodiment, for example, an area of the communication positions may be displayed in a list. More specifically, the map image data 112, which further includes data in which the position on the map and the area are associated with each other, is previously stored in the HDD 54. If the communication positions are requested by any game apparatus 1 which makes up the information processing system 10, the CPU 51 of the server 5 first refers to the current position data 631 as described above. The CPU 51 then searches the communication positions stored in the HDD 54 for the communication positions included in a region having the predetermined size in which the current position indicated by the referred current position data 631 is in the center position. The CPU 51 next refers to the aforementioned map image data 112 to extract areas associated with the searched communication positions, respectively. The CPU 51 generates data that lists the extracted areas by, for example, a text string or image, instead of the communication position image data 101. The CPU 51 then transmits the data that lists the areas to the game apparatus 1 that has requested the communication positions. FIG. 17 shows an example of the display screen of the LCD 38 displaying the data that lists the areas of the respective communication positions near the current position of the game apparatus 1 as described above. In FIG. 17, area images Ju are listed on the LCD 38. The area image Ju indicates an area name of an area that includes the communication positions in the region having the predetermined size near the game apparatus 1 that has requested the communication positions. While, in FIG. 17, a symbol Ry is added merely to one area image, the other similar images indicative of areas are also assumed to be the images that indicate the area names of areas that include the communication positions, respectively. Also, when generating the data listing the areas, the server 5 may generate data indicative of the communication frequency in each area obtained by calculation based on the number of communication positions, the communication count, or the density of the communication positions included in the area associated with the area name. FIG. 17 shows an example of the display screen of the LCD 38 listing the area images Ju further associated with communication frequency images Th. The communication frequency image Th indicates how frequent the communication is performed in the areas of the respective area names, ranking the frequency in the order of A through D. When generating the data listing areas, the CPU 51 may also generate data in which at least either one of the area image Ju and communication frequency image Th is classified by color, according to the communication frequency. Also, the CPU 51 may generate, instead of the communication position image data 101, data which lists, not only the areas, but also region names of regions which are obtained by dividing the map by a predetermined method and in which the communication positions are included. In another embodiment, instead of the region names of the respective regions that include the communication positions, at least either one of the following may be listed: the name of the building present at the center position of the communication positions that are grouped as described above; and the address (place name) of the center position.

[Modification 5]

In the embodiment described above, the case where the communication positions are transmitted from the game apparatus 1 to the server 5 has been described by way of example. In another embodiment, however, the communication position at which the automatic wireless communication is performed and then communication date and time may be associated with each other and transmitted from the game apparatus 1 to the server 5, for example. More specifically, the automatic wireless communication program is configured such that, when it is desired that each game apparatus 1 which makes up the information processing system 10 performs the automatic wireless communication, the communication position and the communication date and time are associated with each other and transmitted to the server 5. The server process program is configured such that the server 5 then accumulates and stores in the HDD 54 the communication position and the communication date and time associated with each other which have been transmitted from the game apparatus 1 which makes up the information processing system 10. This allows the server 5 to generate the record information which indicates the communication position and the communication date and time associated with each other, when the server 5 receives the request for the communication positions from the game apparatus 1. In this case, for example, the communication position display program may be configured such that, when transmitting the communication position request data 63, the game apparatus 1 transmits the communication position request data 63 which includes not only the current position data 631 and also data indicative of a time period specified by the user. This allows the CPU 51 to search the communication positions accumulated in the HDD 54 for only the communication positions associating with the communication date and time that fall within the time period designated by the user. The CPU 51 is then be able to generate the record information indicative of the communication positions associating with the time period designated by the user to transmit to the game apparatus 1 that has requested the communication positions. What is transmitted from the game apparatus 1, being associated with the communication position, is not limited to the communication date and time and may be any one or more types of information, such as information indicative of date, time, and day, as far as the information regards time at which the automatic wireless communication is performed.

Figure 18:
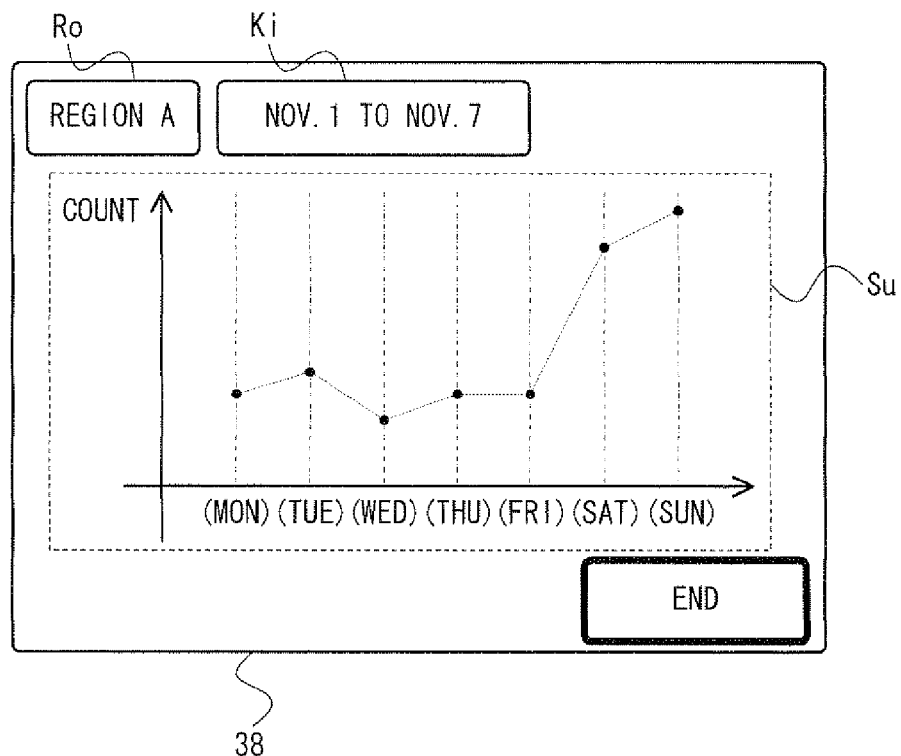
FIG. 18 is a still another example of a display state of the communication positions in the present invention.

Also, in another embodiment in which the communication position and the communication date and time are associated with each other and transmitted to the server 5, transition of the communication count in the region near the current position can be displayed, for example. More specifically, in this case, the CPU 311 of the game apparatus 1 requests the transition of the communication count, instead of the communication positions. Specifically, the CPU 311 of the game apparatus 1 transmits data (hereinafter, referred to as transition request data) to request the transition of the communication count, instead of the communication position request data 63 that is requested in the embodiments described above. When requesting the transition of the communication count, the CPU 311 first accepts the designation of a time period from the user. The CPU 311 determines the time period designated by the user, based on the operation data output from each operation button 37. The CPU 311 then transmits to the server 5 the current position data 631 and data (hereinafter, referred to as designated time period data), which indicates the time period designated by the user, in the transition request data, thereby requesting the transition of the communication count. After accepting the request of the transition of the communication count, the CPU 51 of the server 5 first refers to the current position data 631 included in the transition request data which has been received from the game apparatus 1. The CPU 51 next searches the communication positions accumulated in the HDD 54 for the communication positions that are included in the region having the predetermined size in which the current position indicated by the referred current position data 631 is in the center position. Furthermore, the CPU 51 extracts, from among the searched communication positions, the communication positions which associate with the communication date and time that falls within the time period indicated by the designated time period data included in the transition request data. This allows the CPU 51 to generate an image indicative of the transition of the communication count, based on the extracted communication positions and the communication date and time associating with the extracted communication positions. For example, the CPU 51 classifies the communication date and time each which associate with the extracted communication positions, respectively, by day of the week, and counts the communication positions, which associate with the communication date and time classified by day of the week, as the communication count. The CPU 51 next generates image data indicative of the transition of the communication count for each day of the week, instead of the communication position image data 101 that is generated in the embodiments described above. The CPU 51 then transmits the image data (hereinafter, referred to as transition image data) indicative of the transition of the communication count to the game apparatus 1 that has requested the communication positions. FIG. 18 shows an example of the display screen of the LCD 38 displaying the image represented by the transition image data which has been thus transmitted from the CPU 51 of the server 5. In FIG. 18, a time period image Ki indicative of the time period designated by the user and a transition image Su indicative of the communication count for each day of the week during the time period are displayed on the LCD 38, as an example of the image represented by the transition image data. Also, the CPU 51 of the server 5 may generate the transition image data which represents an image on which a region image Ro is further superimposed as shown in FIG. 18. The region image Ro indicates the region name of the current position of the user. Also, in another embodiment in which the communication position and the communication date and time are associated with each other and transmitted to the server 5, the CPU 51 of the server 5 may generate an image for displaying the transition of the communication count in the region and time period designated by the user, for example. In this case, when requesting the communication positions, the CPU 311 may transmit to the server 5 data indicative of the location of the region designated by the user in the transition request data, instead of the current position data 631.

Figure 19:
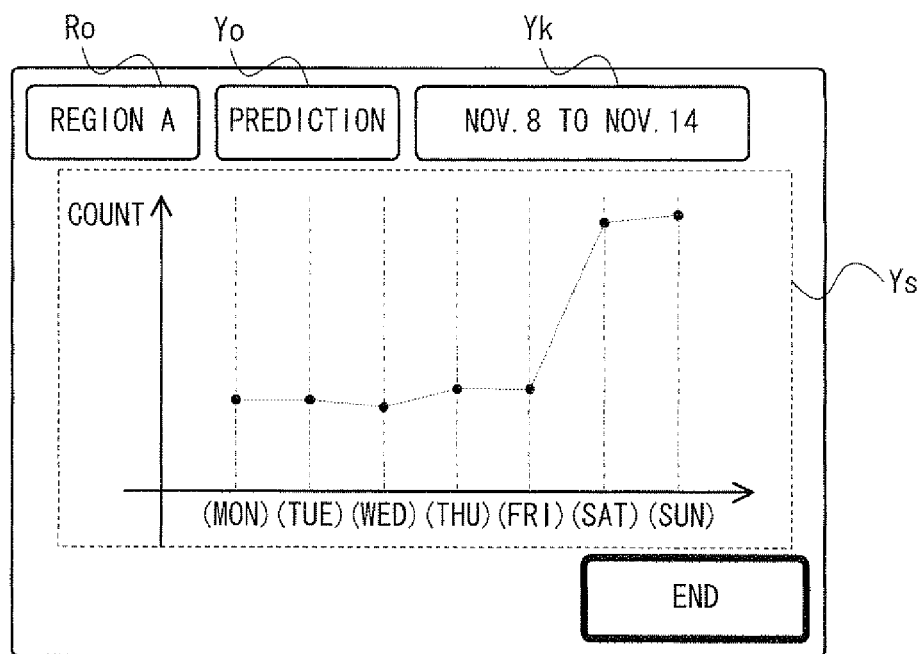
FIG. 19 is a still another example of a display state of the communication positions in the present invention.

Also, in another embodiment in which the communication position and the communication date and time are associated with each other and transmitted to the server 5, the transition of the communication count in the region near the current position can be predicted and displayed, for example. More specifically, in this case, the CPU 311 of the game apparatus 1 requests the prediction of the transition of the communication count from the server 5, instead of requesting the transition of the communication count. Specifically, the CPU 311 of the game apparatus 1 transmits data (hereinafter, referred to as prediction request data) to request the prediction of the transition of the communication count, instead of the transition request data. When requesting the prediction of the transition of the communication count, the CPU 311 first accepts designation of a prediction time period from the user. The CPU 311 determines the prediction time period designated by the user, based on the operation data output from each operation button 37. The CPU 311 then transmits to the server 5 the prediction request data which includes data (hereinafter, referred to as prediction time period data) indicative of the prediction time period and the current position data 631, thereby requesting the prediction of the transition of the communication count. After accepting the request of the prediction of the transition of the communication count, the CPU 51 of the server 5 first determines data necessary for predicting the transition of the communication count during the prediction time period indicated by the prediction time period data included in the prediction request data. Here, the data necessary for predicting the transition of the communication count is, for example, the position data 81 that indicates the communication positions associating with the respective communication date and time in past one year, in the case where a method which requires the communication positions associating with the respective communication date and time in the past one year is used to predict the transition of the communication count during a period from the current date and time thorough to one week later therefrom. The CPU 51 next refers to the current position data 631 included in the prediction request data which has been received from the game apparatus 1. The CPU 51 next searches the communication positions accumulated in the HDD 54 for the communication positions that are included in the predetermined region in which the current position indicated by the referred current position data 631 is in the center position. After searching for the communication positions, the CPU 51 extracts data corresponding to the data already determined to be necessary for the prediction from among the position data 81 that indicates the communication positions that has been searched for. This allows the CPU 51 to generate an image indicative of the prediction result of the transition of the communication count, based on the extracted communication positions and the communication date and time associating with the extracted communication positions. For example, the CPU 51 classifies the communication date and time each associating with the extracted communication positions, respectively, date by date. After classifying the communication date and time date by date, the CPU 51 counts the communication positions associating with the communication date and time classified by date, as the communication count. The CPU 51 then calculates a count as a predicted communication count. The count is obtained by averaging the communication count counted and classified date by date, by day of the week. Next, instead of the transition image data, the CPU 51 generates image data which indicates the transition of the communication count predicted for each day of the week as the result obtained by predicting the transition of the communication count for each day of the week from now through to one week later therefrom. The CPU 51 then transmits the image data (hereinafter, referred to as prediction image data) indicative of the result obtained by predicting the transition of the communication count to the game apparatus 1 that has requested the transition of the communication count. FIG. 19 shows an example of the display screen of the LCD 38 displaying the image represented by the prediction image data transmitted from the CPU 51 of the server 5 as described above. In FIG. 19, a prediction time period image Yk indicative of the prediction time period designated by the user and a predicted transition image Ys indicative of the result obtained by predicting the communication count are displayed on the LCD 38, as an example of the image represented by the prediction image data. When displaying the predicted transition image Ys, the region image Ro may further be displayed as described with reference to FIG. 18. In another embodiment in which the transition of the communication count is predicted, the CPU 51 of the server 5 may generate an image for displaying the result obtained by predicting the transition of the communication count in the region designated by the user, for example. In this case, when requesting the prediction of the transition of the communication count, the CPU 311 of the game apparatus 1 may transmit to the server 5 data indicative of the location of the region designated by the user in the prediction request data, instead of the current position data 631.

[Modification 6]

In the above description, the modification in which the communication position and the communication date and time are associated with each other and transmitted to the server 5 has been described. In another embodiment, however, the program identifier 821 corresponding to the transmission item data 822 communicated by the automatic wireless communication and the communication position may be associated with each other and transmitted from the game apparatus 1 to the server 5. More specifically, the wireless communication program is configured such that, when each game apparatus 1 which makes up the information processing system 10 performs the automatic wireless communication, the program identifier 821 corresponding to the transmission item data 822 and the communication position are associated with each other and transmitted to the server 5. The server process program is configured such that the server 5 accumulates and stores in the HDD 54 the communication position and the program identifier 821, being associated with each other, which are transmitted from each game apparatus 1 which makes up the information processing system 10. This allows the server 5 to generate the record information which indicates the communication positions and the program identifier 821 associating with each other, when the server 5 receives the request of the communication positions by the game apparatus 1. In this case, the communication position display program may be configured such that, for example, when the game apparatus 1 transmits the communication position request data 63, the communication position request data 63 which includes not only the current position data 631 but also the program identifier 821 indicative of the game program specified by the user is transmitted. This allows the CPU 51 to search the communication positions accumulated in the HDD 54 for only the communication positions that associate with the program identifier 821 specified by the user. The CPU 51 is then able to generate the record information which indicates the program identifier 821 and the communication positions of the transmission item data 822, which is handled by the game program identified by the program identifier 821 specified by the user, being associated with each other, and transmits the record information to the user that has requested the communication positions. The game apparatus 1 is able to display only the communication positions of the transmission item data 822 that is handled by the game program identified by the program identifier 821 specified by the user. In this case, an image showing any information indicating the game program, such as the title of the game program (the title of the game) indicated by the program identifier 821 or an icon indicating the game program, may further be displayed on the LCD 38. This allows the user of the game program to understand the communication positions at which the automatic wireless communication is performed even for the item data which is handled by a game program owned by relatively low number of users. The program identifier 821 which is included when the communication position request data 63 is transmitted from the game apparatus 1 is not limited to the program identifier 821 of the game program specified by the user. For example, the program identifier 821 of the game program which is stored in the internal data storage memory 33, or the program identifier 821 of the game program stored in the external memory 39 connected to the external memory I/F 35 may be automatically acquired and included in the communication position request data 63. Instead of the identifier uniquely identifying the program, the communication position and any information uniquely indicates the program may be associated with each other and transmitted from the game apparatus 1.

[Modification 7]

In the above description, the modification in which the communication position and the program identifier 821 are associated with each other and transmitted to the server 5 has been described. In another embodiment, however, the communication position and a user identifier uniquely identifying the user of the game apparatus 1, which has performed the automatic wireless communication, may be associated with each other and transmitted from the game apparatus 1 to the server 5, for example. More specifically, the wireless communication program is configured such that, when each game apparatus 1 which makes up the information processing system 10 performs the automatic wireless communication, the user identifier of the game apparatus 1 and the communication position are associated with each other and transmitted to the server 5. Here, the MAC address of the game apparatus 1 can be used as the user identifier of the game apparatus 1. The server process program is configured such that the server 5 accumulates and stores in the HDD 54 the communication position and the user identifier, being associated with each other, which are transmitted from each game apparatus 1 which makes up the information processing system 10. This allows the server 5 to generate the record information which indicates the communication positions and the user identifier associating with each other, when received the request of the communication positions from the game apparatus 1. In this case, the communication position display program may be configured such that, when the game apparatus 1 transmits the communication position request data 63, the communication position request data 63, which includes not only the current position data 631 but also the user identifier indicative of the user which is specified by the user, is transmitted, for example. This allows the CPU 51 to search the communication positions accumulated in the HDD 54 for only the communication positions that associate with the user identifier specified by the user. The CPU 51 is then able to generate the record information which indicates the user identifier and the communication positions of the game apparatus 1 of the user indicated by the user identifier specified by the user, being associated with each other, and transmits the record information to the user that has requested the communication positions. In this case, the user identifier indicative of the user specified by the user may be a user identifier which is previously registered in the game apparatus 1 of the user who specifies. The user identifier which is previously registered in the game apparatus 1 may be limited to the user identifiers agreed by users indicated by the user identifiers. Instead of the identifier uniquely identifying the user, any information which uniquely indicates the user and the communication position may be associated with each other and transmitted from the game apparatus 1.

In another embodiment in which the communication position and the user identifier are associated with each other and transmitted to the server 5, the communication count may be managed on a per-user basis. More specifically, in the case where the communication position and the user identifier are associated with each other and transmitted to the server 5, the communication position and the user identifier are associated with each other, accumulated, and stored in the HDD 54 as described above. The CPU 51 of the server 5 then counts the communication positions for each user identifier accumulated in the HDD 54 to further manage as the communication count of the communications performed by the user who is indicated by the user identifier. This allows the CPU 51 to identify the user corresponding to the communication count by ranking the user in the descending order of the communication count, for example. If the communication position, the user identifier, and the communication date and time are associated with one another and transmitted to the server 5, it is possible to rank the user in the descending order of the communication count during a predetermined time period. In the case where the user is ranked as described above and if the users from the first rank up to a predetermined rank are fixed, special item data according to the rank may be transmitted to these users via the Internet communication network 3 and AP2 at time when the user is able to accept the special item data.

[Modification 8]

In the embodiment described above, the case of displaying the communication position at which the automatic wireless communication is performed has been described. In another embodiment, however, the automatic wireless communication program may be configured such that, the automatic wireless communication program is performed by the CPU 311 of the game apparatus 1, and information (hereinafter, referred to as acceptance information), which indicates that the game apparatus 1 is now able to accept the communication by the automatic wireless communication, may be instantly transmitted to the server 5, together with the position information (the current position data 631). Furthermore, the automatic wireless communication program may be configured such that, when the communication position display program is executed, data to request a position of the game apparatus 1 that can accept the communication by the automatic wireless communication is transmitted to the server 5, rather than the communication position. When requested the position of the game apparatus 1 that can accept the automatic wireless communication, the CPU 51 of the server 5 may transmit data indicative of the position to the requestor game apparatus 1. This allows the user of each game apparatus 1 which makes up the information processing system 10 to understand the position at which the automatic wireless communication can be performed more certainly.

[Modification 9]

In the embodiment described above, the game apparatuses 1 performing the automatic wireless communication therebetween transmit the position data 81 to the server 5.

In another embodiment, however, only either one of the game apparatuses 1 performing the automatic wireless communication therebetween may transmit the position data 81. More specifically, only either one of the game apparatuses 1 performing the automatic wireless communication therebetween, such as the game apparatus 1 of the parent side described above, may transmit the communication position. In another embodiment, the game apparatus 1 according to the above-described embodiment may be configured to be able to perform the automatic wireless communication with other types of game apparatuses which are capable of performing the automatic wireless communication but incapable of acquiring the position information. In this case, if the game apparatus 1 performs the automatic wireless communication with the other type of the game apparatus, the communication position is transmitted only from the game apparatus 1.

Also, the CPU 51 of the server 5 may perform a process such as associating the communication positions, which are indicated by the respective position data 81 transmitted from the game apparatuses 1 performing the automatic wireless communication therebetween, with each other, or deleting either one of the communication positions. As a method of determining the respective communication positions of the game apparatuses 1 performing the automatic wireless communication therebetween, the method of determining the communication positions that are within less than the predetermined distance therebetween may be used. In the modification in which the communication position and the communication date and time are associated with each other and transmitted to the server 5 as described above, if the communication positions are within less than the predetermined distance therebetween and also if the interval between the communication date and time associated with the respective communication positions is within a predetermined time period, it may be determined that the communication positions are those of the game apparatuses 1 performing the automatic wireless communication therebetween. As another method of determining the communication positions of the respective game apparatuses 1 performing the automatic wireless communication therebetween, an identifier or a number uniquely identifying the automatic wireless communication performed may be added to the position data 81 when the CPU 311 of each game apparatus 1 transmits the position data 81. In this case, the CPU 51 of the server 5 is able to determine that the communication positions indicated by the position data 81 having the same identifier or number added thereto overlap with each other. As a method of associating the communication positions indicated by the respective position data 81 transmitted from the game apparatuses 1 performing the automatic wireless communication therebetween with each other, the apparatus identifier of the own game apparatus 1 and the apparatus identifier of the game apparatus 1 that is the communication partner may be transmitted together with the position data 81. More specifically, the apparatus identifier (the MAC address, for example) of the own game apparatus 1, the apparatus identifier (the MAC address, for example) of the game apparatus 1 that is the communication partner, and the communication date and time are transmitted to the server 5 when the automatic wireless communication is performed. This allows the position data 81 to be transmitted to the server 52 from the game apparatuses 1 performing the automatic wireless communication therebetween, together with the same data which includes the apparatus identifier and the communication date and time, respectively. Therefore, the CPU 51 of the server 5 is able to associate the position data 81 transmitted together with the same data with each other, or determine that the position data 81 overlap with each other, and the like. In this case, the CPU 51 of the server 5 is also able to delete the communication position which is indicated by either one of the overlapping position data 81. The communication positions can be managed by the server 5 regarding that automatic communication is performed once despite the position data 81 is transmitted from each of the game apparatuses 1 performing the automatic wireless communication therebetween as described above.

[Modification 10]

In the embodiment described above, the CPU 311 of the game apparatus 1 displays the image represented by the communication position image data 101 transmitted from the server 5, as it is. In another embodiment, however, among the process of generating the image to be displayed on the LCD 38, part or the entirety of the process steps that can be performed alternatively by the game apparatus 1 can be performed in the game apparatus 1. For example, in the case of displaying the communication position image in the embodiment described above, when the CPU 51 of the server 5 receives the communication position request data 63, the CPU 51 may perform only the process step of transmitting the data representing the map image of the corresponding region and data indicative of the corresponding communication positions. On the other hand, the CPU 311 of the game apparatus 1 may perform the process step of generating an image by performing the process step of plotting the communication positions indicated by the received data on the map image indicated by the received data, and display the image on the LCD 38. Among the process, which is performed by the CPU 51 of the server 5, of generating the image to be displayed on the LCD 38, part or the entirety of the process steps which can be performed alternatively by the game apparatus 1 is performed by the game apparatus 1 as described above, and thereby the respective processing burdens at the game apparatus 1 and the server 5 can be optimized.

[Other Modification]

In the embodiment described above, the position is determined using the GPS 391 built in the external memory 39, and the position data is generated. In another embodiment, however, the GPS 391 that is built in the game apparatus 1 may be used. Also, instead of using the GPS 391, a conventionally known method using the database having stored therein the MAC address of the AP2 and the location, being associated with each other, may be used to determine the position. More specifically, when performing the automatic wireless communication with another game apparatus 1 using the wireless communication module 34 in the game apparatus 1, the CPU 311 accesses the AP2 to acquire the MAC address of the AP2. Furthermore, the CPU 311 may access the aforementioned database via the AP2 and the Internet communication network 3 to refer to the position information associating with the MAC address of the AP2 to determine the position at which the automatic wireless communication is performed, based on the position indicated by the position information. Using the method of acquiring the position information by use of the MAC address of the AP2 as described above allows the communication position to be transmitted to the server 5 even when the automatic wireless communication is performed indoors where a signal required by the GPS 391 for the determination is unreceivable. Moreover, the determination of the position using the GPS 391 and the determination of the position using the MAC address of the AP2 may be alternately conducted appropriately, based on the intensity of a signal received by the GPS 391 and the intensity of a signal (such as the signal indicative of the above-mentioned beacon data) transmitted from the AP2. This allows the communication position to be transmitted to the server 5, regardless of whether the position at which the automatic wireless communication is performed is indoors or outdoors.

In the embodiment described above, the case where the game apparatus 1 performs the communication with the server 5 via the Internet communication network 3 by performing the wireless communication with the AP2 has been described by way of example. In another embodiment, however, the game apparatus 1 may communicate with the server 5 via the Internet communication network 3 by using the second generation communication network (2 G communication network), the second and a half generation communication network (2.5 G communication network) or the third generation communication network (3 G communication network) which are commonly used for wireless call or wireless communication between mobile phones. In this case, a wireless communication module wirelessly connectable to the second generation communication network, the second and a half generation communication network, or the third generation communication network may be further provided in the game apparatus 1, separately from the wireless communication module 34 described above. The game apparatus 1 and the various programs described above may be configured such that the CPU 311 communicates with the server 5 using the wireless communication module provided in the game apparatus 1 separately from the wireless communication module 34. Moreover, in this case, as the method of determining the position of the game apparatus 1, a conventionally known method, which determines the position, based on the result obtained by a communication with a base station which forms the second generation communication network, the second and a half generation communication network, or the third generation communication network, may be used. Furthermore, in this case, the AP2 may include the function as the base station constituting the second generation communication network, the second and a half generation communication network, or the third generation communication network.

In the above description, the case of displaying the communication positions Ti on the map image, the outline or name of the building, or the like has been described. The same method may be used to display lines of trains where the automatic wireless communication is performed, or display such lines of trains according to a time period designated by the user.

Also, in the information processing system 10 according to another embodiment, according to the request received from any game apparatus 1 which makes up the information processing system 10, the game apparatuses 1 present near the current position of the game apparatus 1 may be caused to repeatedly transmit data indicative of the respective communication positions or the like. Furthermore, in this case, the server 5 may give the game apparatuses 1 instructions such as to extend or shorten transmission intervals, as compared to a predetermined default setting, at which the game apparatuses 1 are caused to repeatedly transmit the data indicative of the respective communication positions or the like.

Also, in the information processing system 10 according to another embodiment, the communication count may be regulated by using the user identifier described above such that the automatic wireless communication with the user of the same game apparatus 1 is limited to, for example, once a day. Also, in this case, the communication position of the game apparatus 1 of the user the communication count of which has reached the limit may not be displayed.

In the embodiment described above, the CPU 51 of the server 5 generates the communication position image data 101. In another embodiment, however, the map image data 112 required for generating the communication position image data 101 may be previously stored in the game apparatus 1, and the CPU 311 of the game apparatus 1 may generate the communication position image data 101 by cropping a map image required for displaying the communication position image on the LCD 38 out of a map image represented by the map image data 112. In this case, the CPU 51 of the server 5 may generate data which indicates only the corresponding communication positions, according to the request of the communication positions. In the case where the CPU 51 of the server 5 generates the data indicative of only the corresponding communication positions, the CPU 311 of the game apparatus 1 may download map image data for use, which includes the communication positions indicated by the data, from a database on the Internet.

Also, in another embodiment in which the game apparatus 1 receives the data indicative of only the communication positions from the server 5, the data may be used in the game apparatus 1 without displaying (visualizing) the communication positions. For example, a configuration to realize conventionally known electronic compass and vibration functions may be provided to the game apparatus 1, and the communication positions may be notified by vibration when the user aims the game apparatus 1 to a position indicated by the received data.

Also, in another embodiment, a history of the communication positions at which the own game apparatus 1 has performed the automatic wireless communication may be individually stored in the game apparatus 1 as well as the communication position is transmitted to the server 5. The communication positions indicated by the individually stored history may be displayed when the communication position display program is executed.

Also, in the embodiment described above, the case where the user uses the operation buttons 37 to operate the game apparatus 1 has been described by way of example. In another embodiment, however, the game apparatus 1 may be operated by using, for example, a touch panel provided covering the entire surface of the LCD 38 or another pointing device to accept the operations such as the selection of the program or the designation of the time period as described above.

Also, in the embodiment described above, the communication positions within the region, based on the current position, having the predetermined size are displayed. In another embodiment, however, the user may be able to specify, based on the current position, the size of the region of the communication positions for display. Also, in another embodiment, the map image once displayed may be expanded or reduced. In this case, the server 5 may generate the communication position image data 101 made of a map image which has already relatively high resolution, or the user may receive map image data of a region after the expansion or reduction from the server 5 every time the user performs operations of expansion or reduction.

Also, the programs which are previously stored in the internal data storage memory 33 may be programs acquired from another device by the communication with the other device. For example, the programs may be acquired by downloading from a predetermined server via the Internet communication network 3, or may be acquired by downloading a predetermined program stored in a stationary game apparatus by performing the communication with the stationary game apparatus.

Also, the data which is stored in the internal data storage memory 33 in the embodiment described above may all be stored in the main memory 32 as long as the power is supplied to the game apparatus 1. Then, when an operation to turn off the game apparatus 1 is performed, the game apparatus 1 may be turned off after necessary data is stored in the internal data storage memory 33.

Also, in the embodiment described above, the case where the data to be communicated using the automatic wireless communication is data indicative of the item handled in the game program has been described by way of example. The data to be communicated through the automatic wireless communication is, however, not limited to the data indicative of the item in the game program, and may be, for example, data which indicates a character the user obtained, or the like when the game is executed. Moreover, the data to be communicated by the automatic wireless communication is not limited to the data handled by the game program. For example, it is of course possible to communicate data created by any application software by the automatic wireless communication, such as data indicative of a character which is created by application software such as character creation software. In this case, a program identifier which uniquely identifies the application program is used as the above-described program identifier 821.

Also, in the embodiment described above, the automatic wireless communication program is continuously executed by the CPU 311 as long as the game apparatus 1 is turned on. In another embodiment, however, a microcomputer (not shown) built in the wireless communication module 34 may be caused to execute the automatic wireless communication program. More specifically, the game apparatus 1 may be configured to have a function (what is called power saving mode (sleep mode)) to reduce power consumption by interrupting the power supply to the part or whole components of the internal configuration other than the wireless communication module 34. In this case, among the various types of data required to execute the automatic wireless communication program, the data (such as the communication-prohibited apparatus data 61) to be stored in the main memory 32 is provided internal of the wireless communication module 34 and stored in a memory connected to the microcomputer. In addition, in this case, when the game apparatus 1 is turned on, the microcomputer of the wireless communication module 34 loads the automatic wireless communication program from the internal data storage memory 33 to store in the memory that is included in the module, and then executes the automatic wireless communication program. When the game apparatus 1 turns into the power saving mode, the microcomputer of the wireless communication module 34 continues executing the automatic wireless communication program to perform the automatic wireless communication, according to need, transmitting or receiving the various types of data (such as the transmission item data 822, the reception item data 823, the connection request data 83, and the connection response data 84) that is stored in the internal data storage memory 33. Causing the microcomputer built in the wireless communication module 34 to execute the automatic wireless communication program as described above allows the automatic wireless communication to be performed even when the game apparatus 1 is in the power saving mode. Also, not limiting to the microcomputer built in the wireless communication module 34, any processing means (calculation means) may be caused to execute the automatic wireless communication program in the power saving mode if the power is saved in part of the functions of the CPU 311.

Also, in the embodiment described above, the case where the game program using the automatic wireless communication is executed by the game apparatus 1 has been described. In the game apparatus 1 described above, however, any information processing program, such as game program or application program, is executable, regardless of whether the automatic wireless communication is in use or not. In this case, such information processing program is executed by being selected by the user when the above-described launcher program is executed by the CPU 311.

Also, in the embodiment described above, the game apparatus 1 having the internal configuration required to achieve the present invention has been described by way of example, as shown by way of example in FIG. 1 for the convenience of the description of the present invention. However, it is understood that the internal configuration of the game apparatus 1 is not limited to the components as shown in FIG. 1 and any components to enhance the interest and practicability of the game program or the application program that are executed by the game apparatus 1 may be provided as the internal configuration of the game apparatus 1. The examples are a speaker for emitting a sound according to the program, a touch panel which is provided together with the operation buttons 37, an external data storage memory I/F for attaching an external data storage memory attachable separately from the external memory 39, a camera to take an image, an LCD to configure the game apparatus 1 to have two screens altogether with the LCD 38, a GPU (Graphic Processing Unit) for assisting the process for the CPU 311 to display an image on the LCD, a microphone which receives a sound input from the surroundings, and the like.

Also, in the embodiment described above, the server 5 transmits the record information, which includes the communication position, to the game apparatus 1, according to the request received from the game apparatus 1. In another embodiment, however, the record information which indicates the communication positions may be periodically downloaded from the server 5 by a program, like the automatic wireless communication program, which is executed independently of and in parallel to another program. Alternatively, the record information indicative of the communication positions which is periodically transmitted from the server 5 may be received by the program, like the automatic wireless communication program, which is executed independently of and in parallel to the other program.

Also, in the embodiment described above, the case where the communication position image represented by the communication position image data 101 once received is continuously displayed until the end is selected has been described. In another embodiment, however, the communication position image represented by the communication position image data 101 once received may be updated, for example. Specifically, for example, when displaying the communication position image, the user is allowed to select the update of the communication position image. If the user selects the update of the communication position image, the communication position request data 63 is transmitted from the game apparatus 1 to the server 5 and thereby the game apparatus 1 receives the latest communication position image data 101. In this manner, after the communication position image represented by the communication position image data 101 once received is displayed, the displayed communication position image can be updated by the latest image. An example method of allowing the user to select the update of the communication position image is to previously determine an operation button to be pressed for the update among the operation buttons 37. The update of the communication position image may be conducted when the user selects the update, or may be automatically conducted in a predetermined time after the communication position image is once displayed.

Also, in the embodiment described above, the communication positions managed by the server 5 is output in a form of an image and displayed. In another embodiment, however, the communication positions managed by the server 5 may be output in voice. Describing a specific example thereof, when the server 5 receives the communication position request data 63 from the game apparatus 1, the CPU 51 of the server 5 determines the number of communication positions that exist within the predetermined region based on the current position indicated by the current position data 631 included in the communication position request data 63. An example of a method of determining the number of communication positions in this case is a method of determining whether the number of communication positions is equal to or greater than a predetermined threshold value. If the CPU 51 determines that the number of communication positions is equal to or greater than the predetermined threshold value, data representing, in voice, an address or name of the center position of the predetermined region, for which the number of communication positions is determined, is transmitted to the game apparatus 1 that has transmitted the communication position request data 63. The game apparatus 1 then outputs the date represented in voice. This allows the voice notification to the user of the game apparatus 1 of the communication positions. In this case, it is required to further include a speaker for outputting the voice, in addition to the internal configuration of the game apparatus 1 shown in FIG. 1.

Also, while, in the embodiment described above, the case where the present invention is applied to the hand-held game apparatus 1 has been described, the present invention is applicable not limiting to the hand-held game apparatus. For example, the present invention is also applicable to information processing apparatuses, e.g., portable information terminal apparatuses such as mobile phones, personal handyphone systems (PHS), and PDAs.

While the invention has been described in detail, the foregoing description is in all aspects illustrative and not restrictive. It is understood that numerous other modifications and variations can be devised without departing from the scope of the invention.

What is claimed is:

1. An information processing system comprising:
   a plurality of information processing apparatuses, each of which includes a processing system that includes at least one processor; and
   a server apparatus communicable with the plurality of information processing apparatuses, the server apparatus including a server processing system that includes at least one processor,
   wherein each of the plurality of information processing apparatuses comprises:
      a position information acquisition unit configured to repeatedly acquire a location of the information processing apparatus;
      a wireless communication unit configured to repeatedly search for another information processing apparatus that is within a short-distance wireless communication range to automatically establish a wireless connection therewith and automatically perform communication with the other information processing apparatus, as a communication partner, with which the wireless connection is established; and
      a communication information transmission unit configured to:
         identify the location acquired by the position information acquisition unit when the communication is performed by the wireless communication unit, and
         transmit, in response to performance of the communication over the short-distance wireless communication range with the communication partner, the identified location to the server apparatus as a communication position of the information processing apparatus, the server apparatus comprises:
      a record information generation unit configured to generate record information, based on the respective communication positions transmitted by the communication information transmission unit of the plurality of information processing apparatuses, the record information indicating respective records of the communication performed by the plurality of information processing apparatuses; and
      a record information transmission unit configured to transmit the record information generated by the record information generation unit to the information processing apparatus,
   wherein each of the plurality of information processing apparatuses further comprises a record information output unit configured to output the record information transmitted by the record information transmission unit of the server apparatus,
   wherein position information acquisition unit determines the location of the information processing apparatus independently of performed short-distance wireless communications.

2. The information processing system according to claim 1, wherein the record information output unit is further configured to output the communication positions indicated by the record information to a display device.

3. The information processing system according to claim 2, wherein the record information output unit is configured to output a current location acquired by the position information acquisition unit and the communication positions indicated by the record information to the display device.

4. The information processing system according to claim 2, wherein the record information output unit is configured to output a map indicative of distribution of the communication positions indicated by the record information to the display device as a distribution map.

5. The information processing system according to claim 4, wherein the distribution map includes a map, in which respective images of the communication positions indicated by the record information are superimposed on a map image.

6. The information processing system according to claim 4, wherein, among the communication positions indicated by the record information, the communication positions that satisfy a predetermined positional relationship are grouped and the distribution map includes a map with a region formed of the grouped communication positions.

7. The information processing system according to claim 6, wherein the distribution map includes a superimposed image of a center position of the region formed of the grouped communication positions.

8. The information processing system according to claim 4, wherein the distribution map includes a superimposed indicator for dividing the map into predetermined regions.

9. The information processing system according to claim 8, wherein, based on the communication positions indicated by the record information, the record information output unit is further configured to calculate a density of the communication positions included in each of the predetermined regions into which the map is divided based on the indicator,
wherein the distribution map includes a map with predetermined regions classified by color depending on a calculation result.

10. The information processing system according to claim 8, wherein the distribution map includes a map, on which the indicator a fineness of which is adjusted according to the density of the communication positions included in each of the predetermined regions into which the map is divided based on the indicator.

11. The information processing system according to claim 10, wherein, based on the communication positions indicated by the record information, the record information output unit is further configured to calculate the density of the communication positions included in each of the predetermined regions into which the map is divided based on the indicator, and, if the calculated density of the communication positions in each of the respective predetermined regions is greater than a predetermined threshold value, the record information output unit is configured to output a map, on which an indicator for more finely dividing the predetermined regions is superimposed, to the display device for display as the distribution map.

12. The information processing system according to claim 1, wherein the record information output unit is further configured to calculate a communication count which is obtained by counting the communication positions indicated by the record information in each of respective predetermined regions, and outputs a map indicative of distribution of the communication counts counted for each predetermined region to a display device as a distribution map.

13. The information processing system according to claim 12, wherein the record information output unit is further configured to output a map in which the predetermined regions into which the map is divided based on an indicator are classified by color according to the communication counts counted for respective predetermined regions, to the display device as the distribution map.

14. The information processing system according to claim 1, wherein the record information output unit is further configured to output a list of respective names of regions that include the communication positions indicated by the record information, to a display device.

15. The information processing system according to claim 14, wherein the record information output unit is further configured to extract the regions that include the communication positions indicated by the record information from among regions of a map divided by a predetermined method and output a list of respective names of the extracted regions to the display device.

16. The information processing system according to claim 1, wherein
the communication information transmission unit is further configured to transmit to the server apparatus time information regarding time associated with the communication position at which the communication is performed by the wireless communication unit, together with the communication position, and
the record information generation unit is further configured to generate the record information which indicates, as the respective records of the communication, the respective communication positions of the plurality of information processing apparatuses transmitted by the communication information transmission unit of each of the plurality of information processing apparatuses and the time information associated with the respective communication positions.

17. The information processing system according to claim 16, wherein the record information output unit is further configured to output the communication positions, which are associated with the time information within a predetermined time period and are included in a predetermined region, to a display device.

18. The information processing system according to claim 17, wherein, among the communication positions indicated by the record information, the record information output unit is further configured to count the communication positions, which are associated with the time information within a time period designated by a user and are included in a region specified by the user, as communication count, and output transition of the communication count within the time period to the display device.

19. The information processing system according to claim 18, wherein the record information output unit is further configured to output a result obtained by predicting, based on the communication positions and time information indicated by the record information, the transition of the communication count in the region specified by the user within the time period designated by the user, to the display device.

20. The information processing system according to claim 1, wherein the communication information transmission unit is further configured to transmit, to the server apparatus, program information indicative of a program which handles information communicated by the wireless communication unit, together with the communication position at which the communication is performed by the wireless communication unit,
the record information generation unit is configured to generate the record information, based on the program information and communication position transmitted by the communication information transmission unit of each of the plurality of information processing apparatuses, the record information indicating the respective communication positions of the plurality of information processing apparatuses in association with the program indicated by the program information.

21. The information processing system according to claim 20, wherein the record information output unit is further configured to output the communication positions associated with the program information of a program selected by a user to a display device.

22. The information processing system according to claim 1, wherein
- the communication information transmission unit is further configured to transmit, to the server apparatus, user information indicative of a user of the information processing apparatus with which the communication is performed by the wireless communication unit, together with the communication position at which the communication is performed by the wireless communication unit,
- the record information generation unit is further configured to generate the record information, based on the communication position and user information transmitted by the communication information transmission unit of each of the plurality of information processing apparatuses, the record information indicating the respective communication positions of the plurality of information processing apparatuses in association with the user information, as the respective records of the communication performed by the plurality of information processing apparatuses.

23. The information processing system according to claim 22, wherein the record information output unit is further configured to output the communication position associated with the user information indicative of a user previously registered with a respective information processing apparatus, based on the communication position and user information indicated by the record information transmitted by the record information transmission unit, to a display device.

24. The information processing system according to claim 22, wherein the server apparatus further comprises:
- a communication information reception unit configured to receive the communication position and user information together transmitted by the communication information transmission unit of each of the plurality of information processing apparatuses; and
- a count unit configured to count a number of the communication positions which are received by the communication information reception unit within a predetermined time period for each user information transmitted together with the communication position.

25. An information processing apparatus communicable with another apparatus, the information processing apparatus comprising:
- a wireless transceiver configured to:
  - communicate via short-distance wireless communication with another computing device; and
  - search for other computing devices that are within a communication range of the short-distance wireless communication to automatically establish a wireless connection therewith; and
- a processing system that includes at least one processor, the processing system configured to:
  - acquire positional information of the information processing apparatus;
  - transmit the acquired positional information to a remote server computer system in response to short-distance wireless communication transmissions from the wireless transceiver;
  - receive, from the remote server computer system, positional information that corresponds to reported positions of a plurality of other computing devices where the position of at least one of the plurality of other computing devices is outside the communication range of the short-distance wireless communication of the computing apparatus, where the received position information corresponds to locations where the plurality of other computing devices perform short-distance wireless communications; and
  - generate a display in accordance with the received positional information that corresponds to positions of the plurality of other computing devices,
- wherein the positional information of the information processing apparatus is determined without using short-distance wireless communications.

26. An information processing method used in an information processing apparatus communicable with another apparatus, the method comprising:
- repeatedly acquiring a location of the information processing apparatus;
- repeatedly searching for another apparatus that is within a short-distance wireless communication range to automatically establish a wireless connection therewith and automatically perform communication with the other apparatus, as a communication partner, with which the wireless connection is established;
- transmitting, to a server apparatus and in response to performance of the communication over the short-distance wireless communication range with the communication partner, the acquired location, as a communication position of the information processing apparatus; and
- outputting record information, which is generated by the server apparatus, based on the communication position of a plurality of information processing apparatuses, as information indicative of a record of the communication performed in a range wider than the short-distance wireless communication range of one of the information processing apparatuses by each information processing apparatus,
- wherein the acquired positional information of the information processing apparatus is determined without using short-distance wireless communications.

27. A non-transitory computer-readable storage medium having stored therein an information processing program that is executable by a computer of an information processing apparatus communicable with another apparatus, the information processing program comprising instructions that are, when executed by the computer, configured to:
- repeatedly acquire a location of the information processing apparatus;
- repeatedly search for another apparatus that is within a short-distance wireless communication range to automatically establish a wireless connection therewith and automatically perform short-distance wireless communication with the other apparatus, as a communication partner, with which the wireless connection is established;
- identify the acquired location of the information processing apparatus when wireless communication is performed;
- transmit the identified location, as a communication position of the information processing apparatus, to a server apparatus in response to the performed short-distance wireless communication with the communication partner; and
- output record information, which is generated by the server apparatus based on the transmitted communication position of the information processing apparatus, as information indicative of a record of the communication performed by the information processing apparatus, wherein the acquired positional information of the information processing apparatus is determined without using short-distance wireless communications.

28. A server apparatus communicable with a plurality of information processing apparatuses, the server apparatus comprising:

a communication information reception unit configured to receive, from each of the plurality of information processing apparatuses, a location as a communication position, at which each of the plurality of information processing apparatuses repeatedly searches for another apparatus that is within a short-distance wireless communication range to automatically establish a wireless connection therewith and automatically perform communication with the other apparatus, as a communication partner, with which the wireless connection is established, the location from each of the plurality of information processing apparatuses being sent in response to the automatically performed communication over the short-distance wireless communication range with the communication partner;

a record information generation unit, using a processor of the server apparatus, configured to generate record information, based on the communication positions received by the communication information reception unit, the record information indicating respective records of the communication performed by the plurality of information processing apparatuses; and a record information transmission unit configured to transmit the record information generated by the record information generation unit to the information processing apparatus, wherein the acquired positional information of the information processing apparatus is determined independently of performed short-distance wireless communications.

29. An information processing method used in a server apparatus communicable with a plurality of information processing apparatuses, the information processing method comprising:

receiving, from each of the plurality of information processing apparatuses, a location as a communication position, at which each of the plurality of information processing apparatuses repeatedly searches for another apparatus that is within a short-distance wireless communication range to automatically establish a wireless connection therewith and automatically perform communication with the other apparatus, as a communication partner, with which the wireless connection is established, the location from each of the plurality of information processing apparatuses being sent in response to the automatically performed communication over the short-distance wireless communication range with the communication partner;

generating record information, based on the received communication positions, the record information indicating respective records of the communication performed by the plurality of information processing apparatuses; and transmitting the generated record information to the information processing apparatus, wherein the acquired positional information of the information processing apparatus is determined independently of performed short-distance wireless communications.

30. A non-transitory computer-readable storage medium having stored therein an information processing program that is executable by a computer of a server apparatus communicable with a plurality of information processing apparatuses, the information processing program comprising instructions that are, when executed by the computer, configured to:

receive, from each of the plurality of information processing apparatuses, a location as a communication position, at which each of the plurality of information processing apparatuses repeatedly searches for another apparatus that is within a short-distance wireless communication range to automatically establish a wireless connection therewith and automatically perform communication with the other apparatus, as a communication partner, with which the wireless connection is established, the location from each of the plurality of information processing apparatuses being sent in response to the automatically performed communication over the short-distance wireless communication range with the communication partner;

generate record information based on the received communication positions, the record information indicating respective records of the communication performed by the plurality of information processing apparatuses; and transmit the generated record information to the information processing apparatus, wherein the acquired positional information of the information processing apparatus is determined independently of performed short-distance wireless communications.

31. An information processing system comprising:

a plurality of information processing apparatuses; and a server apparatus communicable with the plurality of information processing apparatuses, wherein each of the plurality of information processing apparatuses comprises:

a position information acquisition unit configured to repeatedly acquire a location of the information processing apparatus;

a wireless communication unit configured to repeatedly search for another apparatus that is within a short-distance wireless communication range to automatically establish a wireless connection therewith and automatically perform communication with the other apparatus, as a communication partner, with which the wireless connection is established; and a communication acceptance information transmission unit configured to transmit, to the server apparatus and in response to performance of the communication over the short-distance wireless communication range with the communication partner, communication acceptance information indicative of a state where the communication by the wireless communication unit is acceptable, together with the acquired location, wherein the server apparatus comprises:

a communication acceptable information transmission unit configured to transmit to each of the plurality of information processing apparatuses a latest location of the information processing apparatus capable of accepting the communication by the wireless communication unit, the latest location being transmitted based on the communication acceptance information transmitted by the communication acceptance information transmission unit of each of the plurality of information processing apparatuses, wherein each of the plurality of information processing apparatuses further comprises an output unit configured to output the latest location transmitted by the communication acceptable information transmission unit, wherein the acquired positional information of the information processing apparatus is determined independently of performed short-distance wireless communications.

32. An information processing system comprising:

a plurality of information processing apparatuses; and a server apparatus communicable with the plurality of information processing apparatuses, wherein each of the plurality of information processing apparatuses comprises:
- a position information acquisition unit for repeatedly acquiring a location of the information processing apparatus;
- a wireless communication unit for repeatedly searching for another apparatus that is within a short-distance wireless communication range to automatically establish a wireless connection therewith and automatically perform communication with the other apparatus, as a communication partner, with which the wireless connection is established; and
- a communication information transmission unit for transmitting to the server apparatus the location acquired by the position information acquisition unit in response to performance of the communication over the short-distance wireless communication range with the communication partner, as a communication position of the information processing apparatus, the server apparatus comprises:
- a communication information storage unit for accumulating and storing the communication position transmitted by the communication information transmission unit of each of the plurality of information processing apparatuses;
- a generation unit for generating the communication positions accumulated by the communication information storage unit as output information to be output by each of the plurality of information processing apparatuses; and
- an output information transmission unit for transmitting the output information generated by the generation unit to each of the plurality of information processing apparatuses, wherein each of the plurality of information processing apparatuses further comprises an output unit for outputting the output information transmitted by the output information transmission unit, wherein the positional information of the information processing apparatus is determined independently of performed short-distance wireless communications.

33. An information processing system comprising:

a plurality of information processing apparatuses; and a server apparatus communicable with the plurality of information processing apparatuses, wherein each of the plurality of information processing apparatuses comprises:
- a positional unit configured to acquire a location of the respective information processing apparatus;
- a wireless communication device configured to repeatedly search for another apparatus that is within a short-distance wireless communication range to automatically establish a wireless connection therewith and automatically perform communication with the other apparatus, as a communication partner, with which the wireless connection is established; and
- a communication information transmitter configured to transmit, to the server apparatus and in response to performance of the communication over the short-distance wireless communication range with the communication partner, as a communication position, either one of the acquired location of the respective information processing apparatus when the communication is performed by the wireless communication device and an acquired location of the communication partner, the server apparatus comprises:
- at least one processor configured to generate record information, based on the respective transmitted communication positions of the plurality of information processing apparatuses, the record information indicating respective records of the communication performed by the plurality of information processing apparatuses; and
- a transmitter configured to transmit the generated record information to the information processing apparatus, wherein each of the plurality of information processing apparatuses further comprises at least one processor configured to output the transmitted record information, wherein the acquired positional information of the information processing apparatus is determined independently of performed short-distance wireless communications.

34. An information processing system comprising:

a plurality of information processing apparatuses; and a server apparatus communicable with the plurality of information processing apparatuses, wherein each of the plurality of information processing apparatuses comprises at least one processor configured to:
- acquire a location of the respective information processing apparatus;
- repeatedly search, via a wireless transmitter, for another apparatus that is within a short-distance wireless communication range and which has necessary information to be transmitted/received, to automatically establish a wireless connection therewith and automatically transmit/receive the necessary information to/from the other apparatus, as a communication partner, with which the wireless connection is established, and
- transmit, to the server apparatus, the acquired location in response to transmission/reception of the necessary information to/from the other apparatus over the short-distance wireless communication range with the communication partner, the acquired location transmitted as a communication position of the information processing apparatus, wherein the server apparatus comprises a processing system that includes at least one processor, the processing system configured to:
- generate record information, based on the respective transmitted communication positions of the plurality of information processing apparatuses, the record information indicating respective records of communications performed by the plurality of information processing apparatuses, and
- transmit the generated record information to the information processing apparatus, wherein the at least one processor of each of the plurality of information processing apparatuses is further configured to output the record information transmitted by the server apparatus, wherein the acquired positional information of the information processing apparatus is determined independently of performed short-distance wireless communications.

* * * * *